(12) United States Patent
Bickerstaff

(10) Patent No.: US 8,155,950 B1
(45) Date of Patent: Apr. 10, 2012

(54) METHOD AND SYSTEM FOR PROVIDING A PERSONALIZED ELECTRONIC DICTIONARY AND VOCABULARY BUILDER

(75) Inventor: Ryan M. Bickerstaff, Palo Alto, CA (US)

(73) Assignee: Intuit Inc., Mountain View, CA (US)

( * ) Notice: Subject to any disclaimer, the term of this patent is extended or adjusted under 35 U.S.C. 154(b) by 659 days.

(21) Appl. No.: 12/274,571

(22) Filed: Nov. 20, 2008

(51) Int. Cl.
*G06F 17/21* (2006.01)
*G06F 17/30* (2006.01)

(52) U.S. Cl. .......................... 704/10; 707/803

(58) Field of Classification Search .................. 707/738, 707/750, 803; 715/234–238; 704/10
See application file for complete search history.

(56) References Cited

U.S. PATENT DOCUMENTS

| | | | |
|---|---|---|---|
| 2008/0222518 A1* | 9/2008 | Walker | 715/245 |
| 2008/0229182 A1* | 9/2008 | Hendricks et al. | 715/205 |
| 2008/0229190 A1* | 9/2008 | Johnson | 715/238 |
| 2010/0003659 A1* | 1/2010 | Edmonds | 434/350 |
| 2010/0092095 A1* | 4/2010 | King et al. | 382/229 |

* cited by examiner

*Primary Examiner* — Cheryl Lewis
(74) *Attorney, Agent, or Firm* — McKay and Hodgson, LLP; Philip McKay

(57) ABSTRACT

A system and method for providing a personalized dictionary and vocabulary building tool whereby data representing an electronic media based version of a document is obtained and at least a portion of the electronic media based version of a document is displayed on a display screen associated with a computing system. A user selects any word in the portion of the document displayed on the display screen and electronic data representing the definition of the user selected word is then obtained from one or more of several electronic media sources. The definition of the user selected word is then displayed in an electronic media format on the same display screen displaying the portion of the electronic media based version of a document. In one example, the electronic data representing the definition of the user selected word, and any other data associated with the user selected word, such as the sentence employing the user selected word from the at least a portion of the electronic media based version of a document, is stored in a data storage device and associated with the user for further reference.

41 Claims, 3 Drawing Sheets

METHOD AND SYSTEM FOR PROVIDING A PERSONALIZED ELECTRONIC DICTIONARY AND VOCABULARY BUILDER

BACKGROUND

As computing systems have come to permeate, and often dominate, both the business world and the consumer world, fewer and fewer documents are circulated, and read/reviewed by a receiver, in a printed or "hard-copy" format. The advent of smaller, and therefore more portable, computing systems, and more sophisticated display devices, has also contributed significantly to this rapid demise of the hard-copy document. In addition, environmental concerns and operational costs, have also led businesses, and individuals, to take measures to minimize paper use. As a result, it is relatively clear that very soon, if it has not already happened, electronic media based documents and text will become the undeniable standard and paper-based documents may well become a thing of the past.

Indeed, the prevalence of electronic media based documents has already extended well beyond the business world into the consumer market as evidenced by the popularity of digital books, including leisure reading, scholastic textbooks, and numerous work/study and professional related texts. In addition, the Internet, and electronic media based news reporting/articles, has already overtaken traditional newspapers as the primary source of printed information for arguably a majority of individuals in the Western World, and certainly for those individuals under the age of 30.

The emergence of electronic media based documents as the dominant text format presents numerous opportunities to manipulate and leverage the digital data nature of electronic media based documents in a way that was impossible with hard-copy based documents. However, currently, many processing opportunities presented by the digital data nature of electronic media based documents have yet to be realized in any tangible way, or at least in a tangible way that is user friendly. Consequently, while electronic media based documents are indeed rapidly becoming the standard, these documents are currently treated, and used, as merely more portable, easily circulated, and convenient versions of their hard-copy counterparts. As a result, currently, the potential of electronic media based documents to provide a significantly enhanced user/reader experience is often not realized.

For instance, if a user/reader of a currently available electronic media based document does not understand a given word presented in an electronic media based document, the user/reader currently must: leave the document, and the context of the word's use; write down or memorize the word, and its spelling; then go to either a hard-copy dictionary, or to an un-related Internet site or database; look up the definition of the word, and hope it is the correct definition for the context of the word's usage in the document; and then, finally return to the document for further reading with the definition hopefully still fresh in the user's mind. This process is not significantly different than the process used for the past four or five hundred years with written and/or printed documents.

The situation discussed above, represents not only an extremely inefficient use of the reader's time, it also takes the reader, and the word, outside of the context of the document, creates an opportunity to introduce error and incorrect meanings of a word for the context of it's use, and, in many cases, the process must be repeated again at some future date when the reader forgets the definition of the word.

SUMMARY

In accordance with one embodiment, a system and method for providing a personalized dictionary and vocabulary building tool includes a process for providing a personalized dictionary and vocabulary building tool whereby data representing an electronic media based version of a document is obtained. In one embodiment, at least a portion of the electronic media based version of a document is displayed on a display screen associated with a computing system. In one embodiment, a user selects any word in the portion of the document displayed on the display screen. In one embodiment, electronic data representing the definition of the user selected word is then obtained from one or more of several electronic media sources. In one embodiment, the definition of the user selected word is then displayed in an electronic media format on the same display screen displaying the at least a portion of the electronic media based version of a document. In one embodiment, the electronic data representing the definition of the user selected word, and any other data associated with the user selected word, such as the sentence employing the user selected word from the at least a portion of the electronic media based version of a document, is stored in a data storage device and associated with the user for further reference.

In one embodiment, the electronic media based version of a document is, but is not limited to, an electronic media based version of one or more of the following: a trade and/or professional book; a work of fiction; a work of non-fiction; a school textbook; a work document; a presentation; a news article; a shared work and/or private document; a legal document; or virtually any document containing at least one word of electronic media based text.

In one embodiment, at least part of the data representing an electronic media based version of a document is obtained either directly, or through a computing system implemented data management system, In one embodiment, at least part of the data representing an electronic media based version of a document is obtained from a database, computing system, and/or a server system, or a web-site or other web-based system, and/or using a computer program product as defined herein.

In one embodiment, at least part of the data representing an electronic media based version of a document is obtained from the Internet.

In one embodiment, at least part of the data representing an electronic media based version of a document is obtained through a network of computing systems and/or server systems that is comprised of multiple different computers, wireless devices, cellular telephones, digital telephones, two-way pagers, personal digital assistants, server computers, or any desired combination of these devices, that are interconnected using a network.

In one embodiment, at least part of the data representing an electronic media based version of a document is obtained through e-mail or through text messaging.

In one embodiment, at least part of the data representing an electronic media based version of a document is obtained using screen scraping technology, or any similar technology, as discussed herein, and/or as known in the art at the time of filing, and/or as developed after the time of filing.

In one embodiment, at least part of the data representing an electronic media based version of a document is obtained using any method, apparatus, process or mechanism for transferring data, images, screen displays, and/or text from one or more devices, computing systems, server systems, databases, web site/web functions and/or any systems to one or more other devices, computing systems, server systems, databases, web site/web functions and/or any systems, whether known at the time of filing or as thereafter developed.

In one embodiment, at least a portion of the document is displayed on a display screen associated with a computing system. Herein, the term "computing system", includes, but is not limited to: a desk top computing system; a portable computer; a workstation; a two-way pager; a cellular telephone; a smart phone; a digital wireless telephone; a Personal Digital Assistant (PDA); a media player, i.e., an MP3 player and/or other music and/or video player; a server computer; an Internet appliance; or any other device that includes components that can execute all, or part, of any one of the processes and/or operations as described herein. In addition, as used herein, the term computing system, can denote, but is not limited to, computing systems made up of multiple: computers; wireless devices; cellular telephones; digital telephones; two-way pagers; PDAs; media players; server computers; or any desired combination of these devices, that are coupled to perform the processes and/or operations as described herein.

In one embodiment, a user selects any word in the portion of the document displayed on the display screen via a user interface device, such as defined herein, and/or using any other device and/or system for converting one or more user actions into computing system based instructions as discussed herein, and/or as known in the art at the time of filing, and/or as developed after the time of filing.

For instance, in one embodiment, a user selects any word in the portion of the document displayed on the display screen by using a user interface device, such as a mouse, keyboard, touch screen, or touch pad, to move a cursor over a selected word. In one embodiment, a user selects any word in the portion of the document displayed on the display screen by using a user interface device, such as a mouse, keyboard, touch screen, or touch pad, to move a cursor over a selected word and hovering it over the selected word. In one embodiment, a user selects any word in the portion of the document displayed on the display screen by using a user interface device, such as a mouse, keyboard, touch screen, or touch pad, to move a cursor over a selected word and clicking on the selected word. In one embodiment, the cursor acts as a "tool tip" to cause a definition of the selected word to be generated and displayed. Other examples of actions a given user could take to select a given word include, but are not limited to: voice commands directed to the electronic media based document; pressing a menu and/or function key on a remote control device; accessing a channel and/or link associated with the electronic media based document; or any other action/inaction on the part of the given user whereby a given word is selected and/or identified, discussed herein, known/available in the art at the time of filing, or as developed after the time of filing.

In one embodiment, electronic data representing the definition of the user selected word is obtained from an electronic media based dictionary, or a portion of an electronic media based dictionary. In one embodiment, electronic data representing the definition of the user selected word is obtained from data included with/attached to the electronic media based document as a vocabulary/glossary attachment. In one embodiment, electronic data representing the definition of the user selected word is obtained from a computing system under control of the user. In one embodiment, electronic data representing the definition of the user selected word is obtained from a computing system under control of the author and/or source of the electronic media based document. In one embodiment, electronic data representing the definition of the user selected word is obtained from a computing system displaying the electronic media based document.

In one embodiment, electronic data representing the definition of the user selected word is obtained from the Internet.

In one embodiment, electronic data representing the definition of the user selected word is obtained either directly, or through a computing system implemented data management system.

In one embodiment, electronic data representing the definition of the user selected word is obtained from a database, third party computing system, and/or a third party server system, or a web-site or other web-based system, and/or using a computer program product as defined herein.

In one embodiment, electronic data representing the definition of the user selected word is obtained through a network of computing systems and/or server systems that is comprised of multiple different computers, wireless devices, cellular telephones, digital telephones, two-way pagers, personal digital assistants, server computers, or any desired combination of these devices, that are interconnected using a network.

In one embodiment, electronic data representing the definition of the user selected word is obtained through e-mail or through text messaging.

In one embodiment, electronic data representing the definition of the user selected word is obtained using screen scraping technology, or any similar technology, as discussed herein, and/or as known in the art at his time of filing, and/or as developed after the time of filing.

In one embodiment, electronic data representing the definition of the user selected word is obtained using any method, apparatus, process or mechanism for transferring data, images, screen displays, and/or text from one or more devices, computing systems, server systems, databases, web site/web functions and/or any systems to one or more other devices, computing systems, server systems, databases, web site/web functions and/or any systems, whether known at the time of filing or as thereafter developed.

In one embodiment, the definition of the user selected word is then displayed in an electronic media format on the same display screen associated with a computing system displaying the at least a portion of the document as a text display, graphical display, or icon. In one embodiment, the definition of the user selected word is displayed in an electronic media format on the display screen associated with a computing system displaying the at least a portion of the document as, but is not limited to, any of the following: a screen pop-up/pop-up window display, graphical device, and/or icon; a Microsoft Windows Vista sidebar gadget display, graphical device, and/or icon, and/or any other sidebar display; a pop-up link display, graphical device, and/or icon; a screen header, footer, sidebar, or frame display, graphical device, and/or icon; any electronic attachment and/or computing system display, graphical device, and/or icon; a video and/or audio display, graphical device, and/or icon; and/or any other electronic media based display, graphical device, and/or icon, known in the art at the time of filing, or as developed/made available after the time of filing.

In one embodiment, in addition to being displayed in an electronic media format on the display screen associated with a computing system displaying the at least a portion of the electronic media format document, the user selected word, the definition of the user selected word, and any other data associated with the user selected word, such as the sentence employing the user selected word from the at least a portion of the electronic media based version of a document, is stored in a data storage device and associated with the user for further reference.

In one embodiment, the user selected word, the definition of the user selected word, and any other data associated with the user selected word, such as the sentence employing the user selected word from the at least a portion of the electronic media based version of a document, is stored in a data storage device such as any main memory or mass memory associated with a computing system, in any server system, in any database, or on/in computer readable medium, and/or any other computer program product, as defined herein. In one embodiment, the data, in whole, or in part, is stored on a webpage or in a web-based system, or any other data storage system, or by any other data storage method, discussed herein, and/or known in the art at the time of filing, and/or as developed after the time of filing. In one embodiment, coupon data and/or storage media is maintained, in whole, or in part, by: the provider of a parent computing system implemented data management system employing process for the providing a personalized dictionary and vocabulary building tool; the provider of process for providing a personalized dictionary and vocabulary building tool; a third party service; or any other parties.

In one embodiment, the user selected word, the definition of the user selected word, and any other data associated with the user selected word, such as the sentence employing the user selected word from the at least a portion of the electronic media based version of a document, is stored in a data storage device and associated with the user for review by the user and use as a vocabulary building and reference tool. In this embodiment, the process for providing a personalized dictionary and vocabulary building tool is particularly useful for helping the user create a personalized dictionary and as a tool to, among other things: increase his or her vocabulary; prepare for standardized tests; quickly become familiar with the vocabulary associated with a new job, skill, or trade; study a new subject; lean a new language; or any other application where a portable and personalized dictionary and vocabulary building tool is beneficial.

In addition, in one embodiment, the user selected word, the definition of the user selected word, and any other data associated with the user selected word, such as the sentence employing the user selected word from the at least a portion of the electronic media based version of a document, is stored in a data storage device and associated with the user for review by the user and use as a vocabulary drilling/testing tool. In this embodiment, the user selected word, the definition of the user selected word, and/or any other data associated with the user selected word is used by the process for providing a personalized dictionary and vocabulary building tool to generate a drilling mechanism whereby, in one example, the user is shown one of the previously user selected words and then the user is provided time to either recite the meaning, or select the meaning from a multiple choice list of possible meanings provided by the process for providing a personalized dictionary and vocabulary building tool.

In addition, in one embodiment, the user selected word, the definition of the user selected word, and any other data associated with the user selected word, such as the sentence employing the user selected word from the at least a portion of the electronic media based version of a document, from multiple users is obtained and stored in a data storage device. In one embodiment, the data is then used to determine/establish a base-line vocabulary for the group of users.

For instance, in one embodiment, the multiple users are students in a given class. In this instance, the members of the class can be provided a given electronic media based document to read and to request/obtain definitions for words in the document as they read using the process for providing a personalized dictionary and vocabulary building tool. Then, the user selected words, and/or the definitions of the user selected words, and/or any other data associated with the user selected words for each of the class members is aggregated and analyzed to evaluate the vocabulary skills of the class as a group. In other embodiments, this same analysis could be used for an employee base or a market research group, or any other group, in a similar manner to determine/establish a base-line vocabulary for the group of users.

Using the process for providing a personalized dictionary and vocabulary building tool, as disclosed herein, when a user/reader of an electronic media based document does not understand a given word presented in an electronic media based document, the user/reader selects the word and the user/reader is then provided an electronic media based display of the definition for the selected word within the display screen on which he or she is currently viewing the electronic media based document. Consequently, using the process for providing a personalized dictionary and vocabulary building tool, as disclosed herein, the user/reader is provided the definition of the selected word without leaving the electronic media based document display, and without leaving the context of the electronic media based document. As a result, using the process for providing a personalized dictionary and vocabulary building tool, as disclosed herein, the user/reader's time is more efficiently used, the user/reader, and the word, are remain within the context of the document, and there is less opportunity to introduce error and incorrect meanings of a word for the context of the word's use.

In addition, in one embodiment of the process for providing a personalized dictionary and vocabulary building tool, as disclosed herein, the user selected word, the definition of the user selected word, and any other data associated with the user selected word, such as the sentence employing the user selected word from the at least a portion of the electronic media based version of a document, is stored in a data storage device and associated with the user for further reference. Consequently, using the process for providing a personalized dictionary and vocabulary building tool, the user selected word, the definition of the user selected word, and any other data associated with the user selected word, can be later recalled by the user to: refresh his or her memory of the meaning of the word; to create a personalized dictionary for the user; to help the user build/review his or her vocabulary; to create a testing/vocabulary building exercise; and/or to establish a base-line analysis of the user's vocabulary skills.

In addition, in one embodiment of the process for providing a personalized dictionary and vocabulary building tool, as disclosed herein, the user selected words, the definition of the user selected words, and any other data associated with the user selected words, for multiple users are stored in a data storage device and associated with the users and/or the group of users for further reference. Consequently, using the process for providing a personalized dictionary and vocabulary building tool, the user selected words, the definition of the user selected words, and any other data associated with the user selected words, can be aggregated and/or analyzed: to create a personalized dictionary for the group of users; to help the group of users group build/review their vocabulary; to create a testing/vocabulary building exercise for the group of users; and/or to establish a base-line analysis of the vocabulary skills of the group of users.

In addition, as discussed in more detail below, using the below embodiments, with little or no modification and/or user input, there is considerable flexibility, adaptability, and opportunity for customization to meet the specific needs of various users under numerous circumstances.

Figure 1:
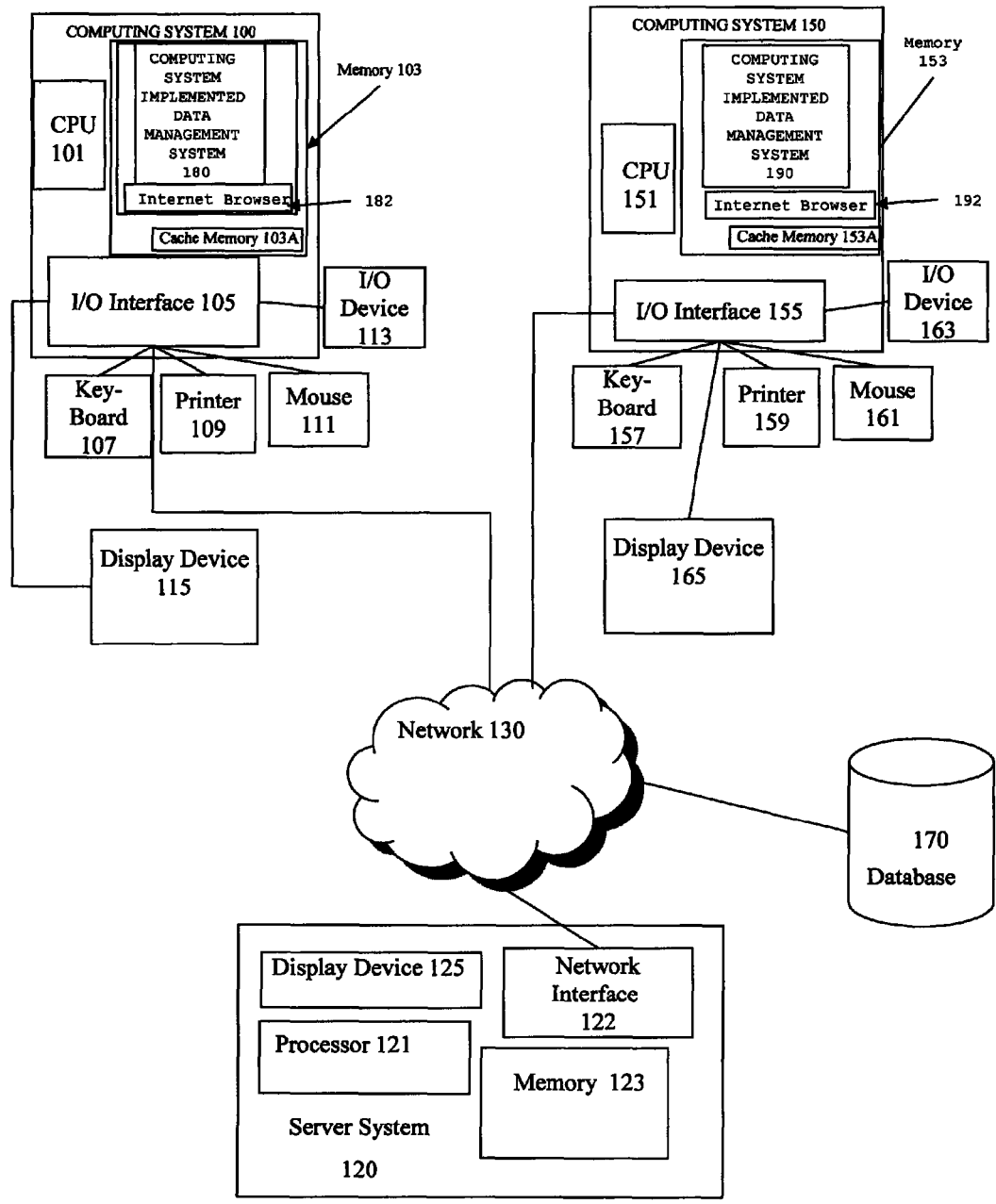
FIG. 1 is a block diagram of an exemplary hardware architecture for implementing one embodiment.

Common reference numerals are used throughout the FIGS. and the detailed description to indicate like elements. One skilled in the art will readily recognize that the above FIGS. are examples and that other architectures, modes of operation, orders of operation and elements/functions can be provided and implemented without departing from the characteristics and features of the invention, as set forth in the claims.

DETAILED DESCRIPTION

Embodiments will now be discussed with reference to the accompanying FIGS., which depict one or more exemplary embodiments. Embodiments may be embodied in many different forms and should not be construed as limited to the embodiments set forth herein, shown in the FIGS., and/or described below. Rather, these exemplary embodiments are provided to allow a complete disclosure that conveys the principles of the invention, as set forth in the claims, to those of skill in the art.

In accordance with one embodiment, a system and method for providing a personalized dictionary and vocabulary building tool includes a process for providing a personalized dictionary and vocabulary building tool whereby data representing an electronic media based version of a document is obtained. In one embodiment, at least a portion of the electronic media based version of a document is displayed on a display screen associated with a computing system. In one embodiment, a user selects any word in the portion of the document displayed on the display screen. In one embodiment, electronic data representing the definition of the user selected word is then obtained from one or more of several electronic media sources. In one embodiment, the definition of the user selected word is then displayed in an electronic media format on the same display screen displaying the at least a portion of the electronic media based version of a document. In one embodiment, the electronic data representing the definition of the user selected word, and any other data associated with the user selected word, such as the sentence employing the user selected word from the at least a portion of the electronic media based version of a document, is stored in a data storage device and associated with the user for further reference.

FIG. 1 is a block diagram of an exemplary hardware architecture for implementing one embodiment of a system and method for providing a personalized dictionary and vocabulary building tool, such as exemplary processes 200 (FIG. 2) and/or 300 (FIG. 3) discussed herein, that, returning to FIG. 1, includes: a computing system 100, e.g., a first computing system; a computing system 150, e.g., a second computing system; a server system 120; and a database 170, all operatively coupled by a network 130.

As seen in FIG. 1, computing system 100 typically includes a central processing unit (CPU) 101, an input/output (I/O) interface 105, and a memory system 103, including cache memory 103A. In one embodiment, memory system 103 includes all, or part, of a computing system implemented data management system 180 such as any computing system implemented data management system defined herein, known in the art at the time of filing, and/or as developed thereafter. In one embodiment, computing system implemented data management system 180 is stored, in whole, or in part, in memory system 103, and is used by, or includes, or is accessed by, a process for providing a personalized dictionary and vocabulary building tool (not shown in FIG. 1, see FIG. 2).

Returning to FIG. 1, computing system 100 may further include standard user interface devices such as a keyboard 107, a mouse 111, a printer 109, and a display device 115, as well as, one or more standard input/output (I/O) devices 113, such as a compact disk (CD) or Digital Video Disc (DVD) drive, floppy disk drive, or other digital or waveform port, or other device capable of inputting data to, and outputting data from, computing system 100, whether available or known at the time of filing or as later developed. As discussed in more detail below, in one embodiment, a process for providing a personalized dictionary and vocabulary building tool, and/or a computing system implemented data management system, are entered, in whole, or in part, into computing system 100 via I/O device 113, such as from a CD, DVD, floppy disk, portable hard drive, memory stick, download site, or other medium and/or computer program product as defined herein.

In one embodiment, computing system 100 also includes an Internet browser capability 182 that, in one embodiment, includes a search engine (not shown) and is stored, in whole, or in part in memory 103.

In one embodiment, data associated with one of more electronic media based versions of documents, one or more user selected words, the definition of the one or more user selected words, and any other data associated with one or more user selected words, is stored, in whole, or in part, in memory system 103, and is used by, or is accessed by, a process for providing a personalized dictionary and vocabulary building tool and/or one or more users. In one embodiment, computing system 100 is a computing system accessible by one or more users. In one embodiment, computing system 100 is used, and/or accessible, by another computing system, such as computing system 150 (discussed below).

In one embodiment, computing system 100 is used, controlled, and/or accessible by, a provider of and/or a computing system implemented data management system and data representing all, or part, of data associated with one of more electronic media based versions of documents, one or more user selected words, the definition of the one or more user selected words, and any other data associated with one or more user selected words, and/or data used to obtain and/or generate and/or display the definition of one or more user selected words, is stored in computing system 100.

Computing system 100 can be any computing system as defined herein and/or as known in the art at the time of filing and/or as developed thereafter, that includes components that can execute all, or part, of a process for providing a personalized dictionary and vocabulary building tool, and/or a computing system implemented data management system, in accordance with at least one of the embodiments as described herein.

Similarly, computing system 150 typically includes a CPU 150, an input/output (I/O) interface 155, and a memory system 153, including cache memory 153A. Similar to computing system 100, computing system 150 may further include standard user interface devices such as a keyboard 157, a mouse 161, a printer 159, and a display device 165, as well as, one or more standard input/output (I/O) devices 163, such as a compact disk (CD) or DVD drive, floppy disk drive, or other digital or waveform port, or other device capable of inputting data to, and outputting data from, computing system 150, whether available or known at the time of filing or as later developed.

In one embodiment, computing system 150 also includes an Internet browser capability 192 that, in one embodiment, includes a search engine (not shown) and is stored, in whole, or in part in memory 153.

In one embodiment, memory system 153 includes all, or part, of a computing system implemented data management system 190, such as any computing system implemented data management system defined herein, known in the art at the time of filing, and/or as developed thereafter. In one embodiment, computing system implemented data management system 190 is stored, in whole, or in part, in memory system 153, and is used by, or includes, or is accessed by, a process for providing a personalized dictionary and vocabulary building tool.

In one embodiment, data associated with one of more electronic media based versions of documents, one or more user selected words, the definition of the one or more user selected words, and any other data associated with one or more user selected words, and/or data used to obtain and/or generate and/or display the definition of one or more user selected words, is stored, in whole, or in part, in memory system 153, and is used by, or is accessed by, a process for providing a personalized dictionary and vocabulary building tool and/or one or more users. In one embodiment, computing system 150 is a computing system accessible by one or more users. In one embodiment, computing system 150 is used, and/or accessible, by another computing system, such as computing system 100.

In one embodiment, computing system 150 is used, controlled, and/or accessible by, a provider of and/or a computing system implemented data management system and data representing all, or part, of data associated with one of more electronic media based versions of documents, one or more user selected words, the definition of the one or more user selected words, and any other data associated with one or more user selected words is stored in computing system 150.

Computing system 150 can be any computing system as defined herein and/or as known in the art at the time of filing and/or as developed thereafter, that includes components that can execute all, or part, of a process for providing a personalized dictionary and vocabulary building tool, and/or a computing system implemented data management system, in accordance with at least one of the embodiments as described herein.

As discussed in more detail below, in one embodiment, all, or part, of a process for providing a personalized dictionary and vocabulary building tool, and/or a computing system implemented data management system, and/or data associated with one of more electronic media based versions of documents, one or more user selected words, the definition of the one or more user selected words, and any other data associated with one or more user selected words, and/or data used to obtain and/or generate and/or display the definition of one or more user selected words, can be loaded, in whole, or in part, into computing system 150 from computing system 100 for storage in memory system 153 and/or cache memory 153A.

Also shown in FIG. 1 is database 170. In one embodiment, database 170 is a data storage device, a designated server system or computing system, or a designated portion of one or more server systems or computing systems, such as computing systems 100, 150 and server system 120, or a distributed database, or an external and/or portable hard drive. In one embodiment, database 170 is a dedicated mass storage device implemented in software, hardware, or a combination of hardware and software. In one embodiment, database 170 includes a web-based function. As discussed in more detail below, in one embodiment, database 170 is under the control of, or otherwise accessible by, a process for providing a personalized dictionary and vocabulary building tool, and/or a computing system implemented data management system.

In one embodiment, data associated with one of more electronic media based versions of documents, one or more user selected words, the definition of the one or more user selected words, and any other data associated with one or more user selected words, and/or data used to obtain and/or generate and/or display the definition of one or more user selected words, is stored, in whole, or in part, in database 170, and is used by, or is accessed by, a process for providing a personalized dictionary and vocabulary building tool. In one embodiment, database 170 is accessible by one or more users. In one embodiment, database 170 is used, and/or accessible, by a computing system, such as computing systems 100 and/or 150, and/or a server system, such as sever system 120 (discussed below).

In one embodiment, database 170 is used, controlled, and/or accessible by, a provider of and/or a computing system implemented data management system and data representing all, or part, of data associated with one of more electronic media based versions of documents, one or more user selected words, the definition of the one or more user selected words, and any other data associated with one or more user selected words is stored in database 170.

In one embodiment, computing systems 100 and 150, and database 170, are coupled to a server system 120 through network 130. In one embodiment, server system 120 includes a server system display device 125, a server system processor 121, a server system memory 123, and a server system network interface 122.

In one embodiment, server system 120 is used in a station-to-station arrangement, such as a peer-to-peer, or hybrid peer-to peer, arrangement, as an indexing and/or central server used to connect a first computing system, such as computing system 100, and a second computing system, such as computing system 150.

In one embodiment, data associated with one of more electronic media based versions of documents, one or more user selected words, the definition of the one or more user selected words, and any other data associated with one or more user selected words is stored, in whole, or in part, in server system 120, and is used by, or is accessed by, a process for providing a personalized dictionary and vocabulary building tool. In one embodiment, server system 120 is accessible by one or more users. In one embodiment, server system 120 is used, and/or accessible, by a computing system, such as computing systems 100 and/or 150, and/or one or more databases, such as database 170.

In one embodiment, server system 120 is used, controlled, and/or accessible by, a provider of and/or a computing system implemented data management system and data representing all, or part, of data associated with one of more electronic media based versions of documents, one or more user selected words, the definition of the one or more user selected words, and any other data associated with one or more user selected words, and/or data used to obtain and/or generate and/or display the definition of one or more user selected words, is stored in server system 120.

Network 130 can be any network or network system as defined herein, and/or known in the art at the time of filing, and/or as developed after the time of filing, capable of allowing communication between two or more computing systems, server systems, and/or databases.

Those of skill in the art will readily recognize that the components shown in FIG. 1, such as computing systems 100 and 150, database 170, server system 120, and their respective components, are shown for illustrative purposes only and that architectures with more or fewer components can implement, and benefit from, one or more embodiments. Moreover, one or more components of computing system 100, computing system 150, database 170, and server system 120 may be located remotely from their respective system and accessed via network 130. In addition, the particular type of, and configuration of, computing systems 100 and 150, database 170, and server system 120 are not relevant.

As discussed in more detail below, in one embodiment, a process for providing a personalized dictionary and vocabulary building tool, and/or a computing system implemented data management system, and/or data associated with one of more electronic media based versions of documents, one or more user selected words, the definition of the one or more user selected words, and any other data associated with one or more user selected words, and/or data used to obtain and/or generate and/or display the definition of one or more user selected words, is stored, in whole, or in part, in memory system 103 and/or cache memory 103A, of computing system 100, and/or memory system 153 and/or cache memory 153A of computing system 150, and/or in server memory system 123 of server system 120 and/or in database 170, and executed on computing system 100 and/or computing system 150. As used herein, a memory refers to a volatile memory, a non-volatile memory, or any combination of the two.

Although a process for providing a personalized dictionary and vocabulary building tool, and/or a computing system implemented data management system, are sometimes referred to herein, alternatively, as a process, an application, a module, a program, a component of a software system, a component of a software package, a component of a parent system, a plug-in, or a feature of a parent system, this terminology is illustrative only. In some embodiments, a process for providing a personalized dictionary and vocabulary building tool, and/or a computing system implemented data management system, are capable of being called from an application or the operating system. In one embodiment, an application, process, or program is generally defined to be any executable code. Moreover, those of skill in the art will understand that when it is said that an application, process, or an operation takes some action, the action is the result of executing one or more instructions by a processor, such as CPUs 101 and 150, or server system processor 121. In one embodiment, execution of a process by CPU 101, CPU 150, or server system processor 121, results in the operations of an agent computer process (not shown) and/or a rule computer process (not shown).

In one embodiment, a process for providing a personalized dictionary and vocabulary building tool, and/or a computing system implemented data management system, and/or data associated with one of more electronic media based versions of documents, one or more user selected words, the definition of the one or more user selected words, and any other data associated with one or more user selected words, and/or data used to obtain and/or generate and/or display the definition of one or more user selected words, are computer applications or processes and/or data implemented and/or run and/or stored, in full, or in part, in, or on, and/or through, a computer program product. Herein, a computer program product comprises a medium and/or I/O device configured to store or transport computer readable code, whether available or known at the time of filing or as later developed. Some examples of computer program products are CDs, DVDs, ROM cards, floppy discs, magnetic tapes, computer hard drives, portable hard drives, flash memory, volatile and non-volatile memory sticks, servers on a network, such as server system 120 of FIG. 1, and signals transmitted over a network, such as network 130 of FIG. 1, or other media or process capable of delivering computer readable data representing computer readable code, whether available or known at the time of filing or as later developed. This medium may belong to a computing system, such as computing systems 100 and 150 of FIG. 1, described above. However, in some embodiments, the medium also may be removable and/or remote from the computing system.

Process

Herein, the terms "document" and "text" and "word" include, but are not limited to, one or more of the following: a trade and/or professional book, or portion thereof; a work of fiction, or portion thereof; a work of non-fiction, or portion thereof; a school textbook, or portion thereof; a work document, or portion thereof; a presentation, or portion thereof; a news article, or portion thereof; a shared work and/or private document, or portion thereof; a legal document, or portion thereof; or virtually any document, or portion thereof, containing at least one word of text.

Herein, the terms "electronic media based version of a document", "electronic document", "digital data representing a document", and "digital document" include, but are not limited to, any documents, or portion thereof, and/or text, or portion thereof, and/or word represented in electronic media and/or format, including, but not limited to: digital text, PDF text; bitmap text; or any other representation of one or more words, in any language, that is capable of being displayed on a display device associated with a computing system as discussed herein, and/or known in the art at the time of filing, and/or as developed after the time of filing.

Herein, the term "user", "user/reader", and "reader" are used to denote any party that uses and/or interacts with the process for providing a personalized dictionary and vocabulary building tool for the purpose of obtaining, or potentially obtaining, the definition of a word in a document.

As used herein, the term "computing system", includes, but is not limited to: a desk-top computing system; a portable computer; a workstation; a two-way pager; a cellular telephone; a smart phone; a digital wireless telephone; a Personal Digital Assistant (PDA); a media player, i.e., an MP3 player and/or other music and/or video player; a server computer; an Internet appliance; or any other device that includes components that can execute all, or part, of any one of the processes and/or operations as described herein. In addition, as used herein, the term computing system, can denote, but is not limited to, computing systems made up of multiple: computers; wireless devices; cellular telephones; digital telephones; two-way pagers; PDAs; media players; server computers; or any desired combination of these devices, that are coupled to perform the processes and/or operations as described herein.

As used herein, the term "computing system implemented data management system" includes, but is not limited to: computing system implemented social networking systems, packages, programs, modules, or applications; computing system implemented inventory systems, packages, programs, modules, or applications; computing system implemented online banking systems, packages, programs, modules, or applications; computing system implemented personal and small business financial management systems, packages, programs, modules, or applications; computing system implemented business systems, packages, programs, modules, or applications; computing system implemented marketing device distribution systems, packages, programs, modules, or applications; computing system implemented financial institution financial management systems, packages, programs, modules, or applications; computing system implemented tax preparation systems, packages, programs, modules, or applications; computing system implemented accounting and/or invoicing systems, packages, programs, modules, or applications; computing system implemented business and/or point of sale systems, packages, programs, modules, or applications; computing system implemented healthcare management systems, packages, programs, modules, or applications and various other electronic data driven data management systems, packages, programs, modules, or applications, whether known at the time of filling or as developed later.

As used herein, the term "network" includes, but is not limited to, any network or network system such as, but not limited to, a peer-to-peer network, a hybrid peer-to-peer network, a Local Area Network (LAN), a Wide Area Network (WAN), a public network, such as the Internet, a private network, a cellular network, a combination of different network types, or other wireless, wired, and/or a wireless and wired combination network capable of allowing communication between two or more computing systems, whether available or known at the time of filing or as later developed.

As used herein, the term "database" includes, but is not limited to, any data storage mechanism known at the time of filing or as developed thereafter, such as, but not limited to: a data storage device; a designated server system or computing system, or a designated portion of one or more server systems or computing systems; a mobile computing system; a server system network; a distributed database; or an external and/or portable hard drive. Herein, the term "database" can refer to a dedicated mass storage device implemented in software, hardware, or a combination of hardware and software. Herein, the term "database" can refer to a web-based function. Herein, the term "database" can refer to any data storage means that is part of, or under the control of, any computing system, as defined herein, known at the time of filing, or as developed thereafter.

In accordance with one embodiment, a system and method for providing a personalized dictionary and vocabulary building tool includes a process for providing a personalized dictionary and vocabulary building tool whereby data representing an electronic media based version of a document is obtained. In one embodiment, at least a portion of the electronic media based version of a document is displayed on a display screen associated with a computing system. In one embodiment, a user selects any word in the portion of the document displayed on the display screen. In one embodiment, electronic data representing the definition of the user selected word is then obtained from one or more of several electronic media sources. In one embodiment, the definition of the user selected word is then displayed in an electronic media format on the same display screen displaying the at least a portion of the electronic media based version of a document.

Figure 2:
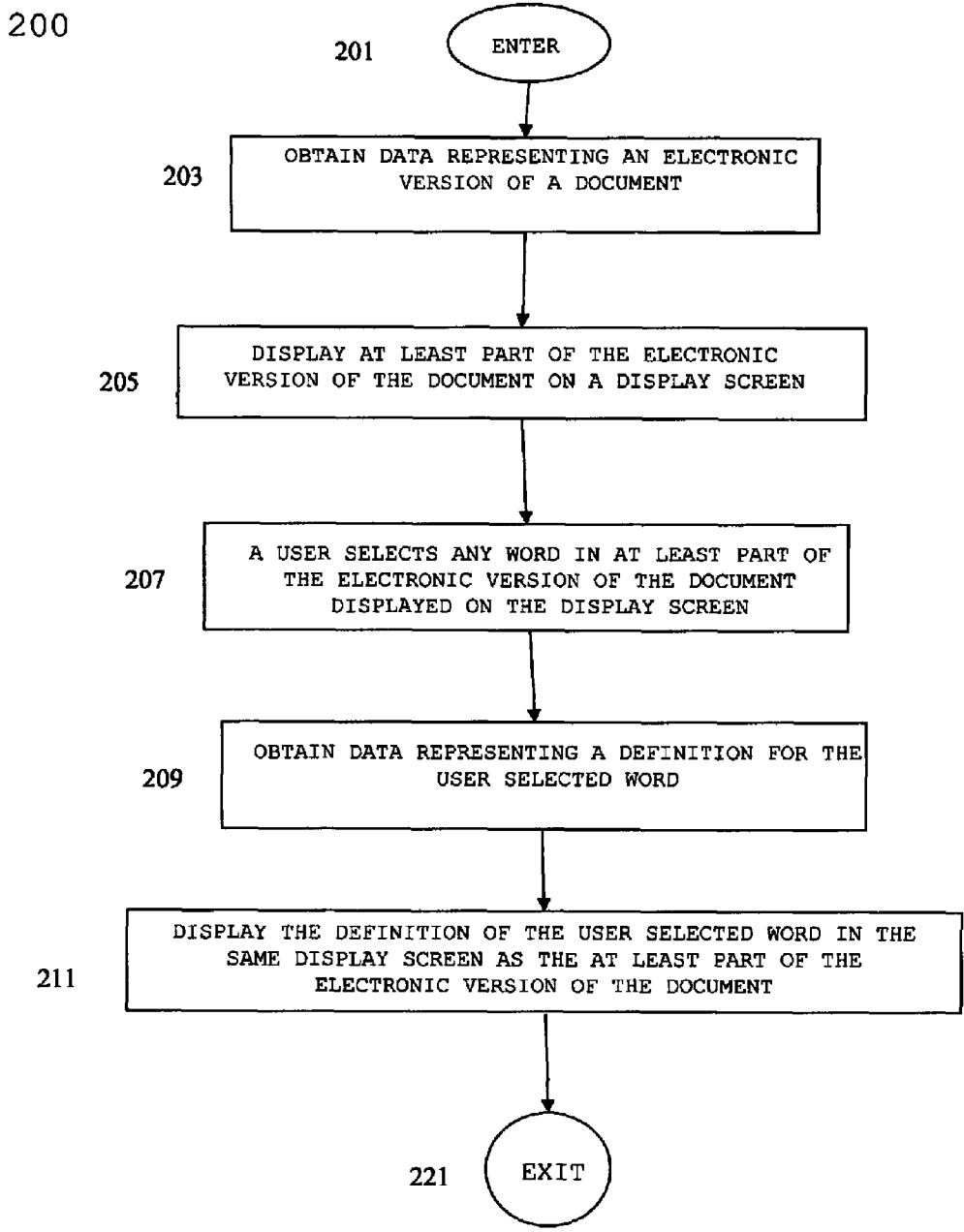
FIG. 2 is a flow chart depicting a process for providing a personalized dictionary and vocabulary building tool in accordance with one embodiment.

FIG. 2 is a flow chart depicting a process for providing a personalized dictionary and vocabulary building tool 200 in accordance with one embodiment. Process for providing a personalized dictionary and vocabulary building tool 200 begins at ENTER OPERATION 201 and process flow proceeds to OBTAIN DATA REPRESENTING AN ELECTRONIC VERSION OF A DOCUMENT OPERATION 203. In one embodiment, at OBTAIN DATA REPRESENTING AN ELECTRONIC VERSION OF A DOCUMENT OPERATION 203 an electronic media based version of a document, or portion of a document, is obtained.

As noted above, herein, the terms "document" and "text" and "word" include, but are not limited to, one or more of the following: a trade and/or professional book, or portion thereof; a work of fiction, or portion thereof; a work of non-fiction, or portion thereof; a school textbook, or portion thereof; a work document, or portion thereof; a presentation, or portion thereof; a news article, or portion thereof; a shared work and/or private document, or portion thereof; a legal document, or portion thereof; or virtually any document, or portion thereof, containing at least one word of text.

As also noted above, herein, the terms "electronic media based version of a document", "electronic document", "digital data representing a document", and "digital document" include, but are not limited to, any documents, or portion thereof, and/or text, or portion thereof, and/or word represented in electronic media and/or format, including, but not limited to: digital text, PDF text; bitmap text; or any other representation of one or more words, in any language, that is capable of being displayed on a display device associated with a computing system as discussed herein, and/or known in the art at the time of filing, and/or as developed after the time of filing.

In one embodiment, at OBTAIN DATA REPRESENTING AN ELECTRONIC VERSION OF A DOCUMENT OPERATION 203 at least part of the data representing an electronic media based version of a document is obtained either directly, or through a computing system implemented data management system, such as computing system implemented data management systems 180 and/or 190 of FIG. 1, that implements, includes, is accessible by, and/or is otherwise associated with, process for providing a personalized dictionary and vocabulary building tool 200 (FIG. 2), and/or the coupon provider.

In one embodiment, at OBTAIN DATA REPRESENTING AN ELECTRONIC VERSION OF A DOCUMENT OPERATION 203 at least part of the data representing an electronic media based version of a document is obtained by providing process for providing a personalized dictionary and vocabulary building tool 200, and/or a computing system implemented data management system associated with process for providing a personalized dictionary and vocabulary building tool 200, access to the data on a database, such as database 170 of FIG. 1, a computing system, such as computing systems 100 and/or 150 of FIG. 1, and/or a server system, such as server system 120 of FIG. 1, or a web-site or other web-based system, and/or using a computer program product as defined herein.

In one embodiment, at OBTAIN DATA REPRESENTING AN ELECTRONIC VERSION OF A DOCUMENT OPERATION 203 at least part of the data representing an electronic media based version of a document is obtained from the Internet.

Returning to FIG. 2, in one embodiment, at OBTAIN DATA REPRESENTING AN ELECTRONIC VERSION OF A DOCUMENT OPERATION 203 at least part of the data representing an electronic media based version of a document is obtained through a network of computing systems and/or server systems that is comprised of multiple different computers, wireless devices, cellular telephones, digital telephones, two-way pagers, personal digital assistants, server computers, or any desired combination of these devices, that are interconnected using a network, such as network 130 of FIG. 1.

Returning to FIG. 2, in one embodiment, at OBTAIN DATA REPRESENTING AN ELECTRONIC VERSION OF A DOCUMENT OPERATION 203 at least part of the data representing an electronic media based version of a document is obtained through e-mail or through text messaging.

In one embodiment, at OBTAIN DATA REPRESENTING AN ELECTRONIC VERSION OF A DOCUMENT OPERATION 203 at least part of the data representing an electronic media based version of a document is obtained using screen scraping technology, or any similar technology, as discussed herein, and/or as known in the art at the time of filing, and/or as developed after the time of filing.

In one embodiment, at OBTAIN DATA REPRESENTING AN ELECTRONIC VERSION OF A DOCUMENT OPERATION 203 at least part of the data representing an electronic media based version of a document is obtained using any method, apparatus, process or mechanism for transferring data, images, screen displays, and/or text from one or more devices, computing systems, server systems, databases, web site/web functions and/or any systems to one or more other devices, computing systems, server systems, databases, web site/web functions and/or any systems, whether known at the time of filing or as thereafter developed.

In one embodiment, once an electronic media based version of a document, or portion of a document, is obtained at OBTAIN DATA REPRESENTING AN ELECTRONIC VERSION OF A DOCUMENT OPERATION 203, process flow proceeds to DISPLAY AT LEAST PART OF THE ELECTRONIC VERSION OF THE DOCUMENT ON A DISPLAY SCREEN OPERATION 205.

In one embodiment, at DISPLAY AT LEAST PART OF THE ELECTRONIC VERSION OF THE DOCUMENT ON A DISPLAY SCREEN OPERATION 205 at least a portion of the electronic media based version of a document of OBTAIN DATA REPRESENTING AN ELECTRONIC VERSION OF A DOCUMENT OPERATION 203 is displayed on a display screen associated with a computing system.

In one embodiment, at DISPLAY AT LEAST PART OF THE ELECTRONIC VERSION OF THE DOCUMENT ON A DISPLAY SCREEN OPERATION 205 at least a portion of the electronic media based version of a document of OBTAIN DATA REPRESENTING AN ELECTRONIC VERSION OF A DOCUMENT OPERATION 203 is displayed on a display screen of a display device, such as display devices 115, 165 and/or 125 of FIG. 1, associated with a computing system such as computing systems 100 and 150 of FIG. 1 and/or server system 120 of FIG. 1, and/or any computing system as defined herein, discussed herein, and/or as known in the art at the time of filing, and/or as developed after the time of filing.

As noted above, herein, the term "computing system", includes, but is not limited to: a desk top computing system; a portable computer; a workstation; a two-way pager; a cellular telephone; a smart phone; a digital wireless telephone; a Personal Digital Assistant (PDA); a media player, i.e., an MP3 player and/or other music and/or video player; a server computer; an Internet appliance; or any other device that includes components that can execute all, or part, of any one of the processes and/or operations as described herein. In addition, as used herein, the term computing system, can denote, but is not limited to, computing systems made up of multiple: computers; wireless devices; cellular telephones; digital telephones; two-way pagers; PDAs; media players; server computers; or any desired combination of these devices, that are coupled to perform the processes and/or operations as described herein.

Returning to FIG. 2, in one embodiment, once at least a portion of the electronic media based version of a document of OBTAIN DATA REPRESENTING AN ELECTRONIC VERSION OF A DOCUMENT OPERATION 203 is displayed on a display screen associated with a computing system at DISPLAY AT LEAST PART OF THE ELECTRONIC VERSION OF THE DOCUMENT ON A DISPLAY SCREEN OPERATION 205, process flow proceeds to A USER SELECTS ANY WORD IN AT LEAST PART OF THE ELECTRONIC VERSION OF THE DOCUMENT DISPLAYED ON THE DISPLAY SCREEN OPERATION 207.

In one embodiment, at A USER SELECTS ANY WORD IN AT LEAST PART OF THE ELECTRONIC VERSION OF THE DOCUMENT DISPLAYED ON THE DISPLAY SCREEN OPERATION 207 a user selects any word in the portion of the document of OBTAIN DATA REPRESENTING AN ELECTRONIC VERSION OF A DOCUMENT OPERATION 203 displayed on the display screen at DISPLAY AT LEAST PART OF THE ELECTRONIC VERSION OF THE DOCUMENT ON A DISPLAY SCREEN OPERATION 205.

In one embodiment, at A USER SELECTS ANY WORD IN AT LEAST PART OF THE ELECTRONIC VERSION OF THE DOCUMENT DISPLAYED ON THE DISPLAY SCREEN OPERATION 207 a user selects any word in the portion of the document of OBTAIN DATA REPRESENTING AN ELECTRONIC VERSION OF A DOCUMENT OPERATION 203 displayed on the display screen at DISPLAY AT LEAST PART OF THE ELECTRONIC VERSION OF THE DOCUMENT ON A DISPLAY SCREEN OPERATION 205 via a user interface device, such keyboards 107 and 157 of FIG. 1, mice 111 and 161 of FIG. 1 and I/O devices 113 and 163 of FIG. 1, and/or as defined herein, and/or using any other device and/or system for converting one or more user actions into computing system based instructions as discussed herein, and/or as known in the art at the time of filing, and/or as developed after the time of filing.

For instance, in one embodiment, at A USER SELECTS ANY WORD IN AT LEAST PART OF THE ELECTRONIC VERSION OF THE DOCUMENT DISPLAYED ON THE DISPLAY SCREEN OPERATION 207 a user selects any word in the portion of the document of OBTAIN DATA REPRESENTING AN ELECTRONIC VERSION OF A DOCUMENT OPERATION 203 displayed on the display screen at DISPLAY AT LEAST PART OF THE ELECTRONIC VERSION OF THE DOCUMENT ON A DISPLAY SCREEN OPERATION 205 by using a user interface device, such as a mouse, keyboard, touch screen, or touch pad, to move a cursor over a selected word.

In one embodiment, at A USER SELECTS ANY WORD IN AT LEAST PART OF THE ELECTRONIC VERSION OF THE DOCUMENT DISPLAYED ON THE DISPLAY SCREEN OPERATION 207 a user selects any word in the portion of the document of OBTAIN DATA REPRESENTING AN ELECTRONIC VERSION OF A DOCUMENT OPERATION 203 displayed on the display screen at DISPLAY AT LEAST PART OF THE ELECTRONIC VERSION OF THE DOCUMENT ON A DISPLAY SCREEN OPERATION 205 by using a user interface device, such as a mouse, keyboard, touch screen, or touch pad, to move a cursor over a selected word highlight the selected word.

In one embodiment, at A USER SELECTS ANY WORD IN AT LEAST PART OF THE ELECTRONIC VERSION OF THE DOCUMENT DISPLAYED ON THE DISPLAY SCREEN OPERATION 207 a user selects any word in the portion of the document of OBTAIN DATA REPRESENTING AN ELECTRONIC VERSION OF A DOCUMENT OPERATION 203 displayed on the display screen at DISPLAY AT LEAST PART OF THE ELECTRONIC VERSION OF THE DOCUMENT ON A DISPLAY SCREEN OPERATION 205 by using a user interface device, such as a mouse, keyboard, touch screen, or touch pad, to move a cursor over a selected word and hovering it over the selected word.

In one embodiment, at A USER SELECTS ANY WORD IN AT LEAST PART OF THE ELECTRONIC VERSION OF THE DOCUMENT DISPLAYED ON THE DISPLAY SCREEN OPERATION 207 a user selects any word in the portion of the document of OBTAIN DATA REPRESENTING AN ELECTRONIC VERSION OF A DOCUMENT OPERATION 203 displayed on the display screen at DISPLAY AT LEAST PART OF THE ELECTRONIC VERSION OF THE DOCUMENT ON A DISPLAY SCREEN OPERATION 205 by using a user interface device, such as a mouse, keyboard, touch screen, or touch pad, to move a cursor over a selected word and clicking on the selected word.

In one embodiment, at A USER SELECTS ANY WORD IN AT LEAST PART OF THE ELECTRONIC VERSION OF THE DOCUMENT DISPLAYED ON THE DISPLAY SCREEN OPERATION 207 a user selects any word in the portion of the document of OBTAIN DATA REPRESENTING AN ELECTRONIC VERSION OF A DOCUMENT OPERATION 203 displayed on the display screen at DISPLAY AT LEAST PART OF THE ELECTRONIC VERSION OF THE DOCUMENT ON A DISPLAY SCREEN OPERATION 205 the cursor acts as a "tool tip" to cause a definition of the selected word to be generated and displayed.

In other embodiments, at A USER SELECTS ANY WORD IN AT LEAST PART OF THE ELECTRONIC VERSION OF THE DOCUMENT DISPLAYED ON THE DISPLAY SCREEN OPERATION 207 a user selects any word in the portion of the document of OBTAIN DATA REPRESENTING AN ELECTRONIC VERSION OF A DOCUMENT OPERATION 203 displayed on the display screen at DISPLAY AT LEAST PART OF THE ELECTRONIC VERSION OF THE DOCUMENT ON A DISPLAY SCREEN OPERATION 205 by, but not limited to: voice commands directed to the electronic media based document; pressing a menu and/or function key on a remote control device; accessing a channel and/or link associated with the electronic media based document; or any other action/inaction on the part of the given user whereby a given word is selected and/or identified, discussed herein, known/available in the art at the time of filing, or as developed after the time of filing.

Numerous methods, means, processes, and procedures are known in the art for allowing a user to selects a portion of an electronic media based document. Consequently, a more detailed discussion of the specific methods, means, processes, and procedures that can be employed at A USER SELECTS ANY WORD IN AT LEAST PART OF THE ELECTRONIC VERSION OF THE DOCUMENT DISPLAYED ON THE DISPLAY SCREEN OPERATION 207 are omitted here to avoid detracting from the invention.

In one embodiment, once a user selects any word in the portion of the document of OBTAIN DATA REPRESENTING AN ELECTRONIC VERSION OF A DOCUMENT OPERATION 203 displayed on the display screen at DISPLAY AT LEAST PART OF THE ELECTRONIC VERSION OF THE DOCUMENT ON A DISPLAY SCREEN OPERATION 205 at A USER SELECTS ANY WORD IN AT LEAST PART OF THE ELECTRONIC VERSION OF THE DOCUMENT DISPLAYED ON THE DISPLAY SCREEN OPERATION 207, process flow proceeds to OBTAIN DATA REPRESENTING A DEFINITION FOR THE USER SELECTED WORD OPERATION 209.

In one embodiment, at OBTAIN DATA REPRESENTING A DEFINITION FOR THE USER SELECTED WORD OPERATION 209 electronic data representing the definition of the user selected word of A USER SELECTS ANY WORD IN AT LEAST PART OF THE ELECTRONIC VERSION OF THE DOCUMENT DISPLAYED ON THE DISPLAY SCREEN OPERATION 207 is obtained from one or more of several electronic media sources.

In one embodiment, at OBTAIN DATA REPRESENTING A DEFINITION FOR THE USER SELECTED WORD OPERATION 209 electronic data representing the definition of the user selected word of A USER SELECTS ANY WORD IN AT LEAST PART OF THE ELECTRONIC VERSION OF THE DOCUMENT DISPLAYED ON THE DISPLAY SCREEN OPERATION 207 is obtained from an electronic media based dictionary, or a portion of an electronic media based dictionary.

In one embodiment, at OBTAIN DATA REPRESENTING A DEFINITION FOR THE USER SELECTED WORD OPERATION 209 electronic data representing the definition of the user selected word of A USER SELECTS ANY WORD IN AT LEAST PART OF THE ELECTRONIC VERSION OF THE DOCUMENT DISPLAYED ON THE DISPLAY SCREEN OPERATION 207 is obtained from data included with, and/or attached to the electronic media based document of OBTAIN DATA REPRESENTING AN ELECTRONIC VERSION OF A DOCUMENT OPERATION 203 as a vocabulary/glossary attachment.

In one embodiment, at OBTAIN DATA REPRESENTING A DEFINITION FOR THE USER SELECTED WORD OPERATION 209 electronic data representing the definition of the user selected word of A USER SELECTS ANY WORD IN AT LEAST PART OF THE ELECTRONIC VERSION OF THE DOCUMENT DISPLAYED ON THE DISPLAY SCREEN OPERATION 207 is obtained from a computing system under control of the user.

In one embodiment, at OBTAIN DATA REPRESENTING A DEFINITION FOR THE USER SELECTED WORD OPERATION 209 electronic data representing the definition of the user selected word of A USER SELECTS ANY WORD IN AT LEAST PART OF THE ELECTRONIC VERSION OF THE DOCUMENT DISPLAYED ON THE DISPLAY SCREEN OPERATION 207 is obtained from a computing system under control of the author and/or source of the electronic media based document of OBTAIN DATA REPRESENTING AN ELECTRONIC VERSION OF A DOCUMENT OPERATION 203.

In one embodiment, at OBTAIN DATA REPRESENTING A DEFINITION FOR THE USER SELECTED WORD OPERATION 209 electronic data representing the definition of the user selected word of A USER SELECTS ANY WORD IN AT LEAST PART OF THE ELECTRONIC VERSION OF THE DOCUMENT DISPLAYED ON THE DISPLAY SCREEN OPERATION 207 is obtained from the computing system displaying the electronic media based document of DISPLAY AT LEAST PART OF THE ELECTRONIC VERSION OF THE DOCUMENT ON A DISPLAY SCREEN OPERATION 205.

In one embodiment, at OBTAIN DATA REPRESENTING A DEFINITION FOR THE USER SELECTED WORD OPERATION 209 electronic data representing the definition of the user selected word of A USER SELECTS ANY WORD IN AT LEAST PART OF THE ELECTRONIC VERSION OF THE DOCUMENT DISPLAYED ON THE DISPLAY SCREEN OPERATION 207 is obtained from the Internet.

In one embodiment, at OBTAIN DATA REPRESENTING A DEFINITION FOR THE USER SELECTED WORD OPERATION 209 electronic data representing the definition of the user selected word of A USER SELECTS ANY WORD IN AT LEAST PART OF THE ELECTRONIC VERSION OF THE DOCUMENT DISPLAYED ON THE DISPLAY SCREEN OPERATION 207 is obtained either directly, or through a computing system implemented data management system.

In one embodiment, at OBTAIN DATA REPRESENTING A DEFINITION FOR THE USER SELECTED WORD OPERATION 209 electronic data representing the definition of the user selected word of A USER SELECTS ANY WORD IN AT LEAST PART OF THE ELECTRONIC VERSION OF THE DOCUMENT DISPLAYED ON THE DISPLAY SCREEN OPERATION 207 is obtained from a database, third party computing system, and/or a third party server system, or a web-site or other web-based system, and/or using a computer program product as defined herein.

In one embodiment, at OBTAIN DATA REPRESENTING A DEFINITION FOR THE USER SELECTED WORD OPERATION 209 electronic data representing the definition of the user selected word of A USER SELECTS ANY WORD IN AT LEAST PART OF THE ELECTRONIC VERSION OF THE DOCUMENT DISPLAYED ON THE DISPLAY SCREEN OPERATION 207 is obtained through a network of computing systems and/or server systems that is comprised of multiple different computers, wireless devices, cellular telephones, digital telephones, two-way pagers, personal digital assistants, server computers, or any desired combination of these devices, that are interconnected using a network.

In one embodiment, at OBTAIN DATA REPRESENTING A DEFINITION FOR THE USER SELECTED WORD OPERATION 209 electronic data representing the definition of the user selected word of A USER SELECTS ANY WORD IN AT LEAST PART OF THE ELECTRONIC VERSION OF THE DOCUMENT DISPLAYED ON THE DISPLAY SCREEN OPERATION 207 is obtained through e-mail or through text messaging.

In one embodiment, at OBTAIN DATA REPRESENTING A DEFINITION FOR THE USER SELECTED WORD OPERATION 209 electronic data representing the definition of the user selected word of A USER SELECTS ANY WORD IN AT LEAST PART OF THE ELECTRONIC VERSION OF THE DOCUMENT DISPLAYED ON THE DISPLAY SCREEN OPERATION 207 is obtained using screen scraping technology, or any similar technology, as discussed herein, and/or as known in the art at his time of filing, and/or as developed after the time of filing.

In one embodiment, at OBTAIN DATA REPRESENTING A DEFINITION FOR THE USER SELECTED WORD OPERATION 209 electronic data representing the definition of the user selected word of A USER SELECTS ANY WORD IN AT LEAST PART OF THE ELECTRONIC VERSION OF THE DOCUMENT DISPLAYED ON THE DISPLAY SCREEN OPERATION 207 is obtained from any source of the definition of the of the user selected word, using any method, apparatus, process or mechanism for transferring data, images, screen displays, and/or text from one or more devices, computing systems, server systems, databases, web site/web functions and/or any systems to one or more other devices, computing systems, server systems, databases, web site/web functions and/or any systems, whether known at the time of filing or as thereafter developed.

In one embodiment, once electronic data representing the definition of the user selected word of A USER SELECTS ANY WORD IN AT LEAST PART OF THE ELECTRONIC VERSION OF THE DOCUMENT DISPLAYED ON THE DISPLAY SCREEN OPERATION 207 is obtained at OBTAIN DATA REPRESENTING A DEFINITION FOR THE USER SELECTED WORD OPERATION 209, process flow proceeds to DISPLAY THE DEFINITION OF THE USER SELECTED WORD IN THE SAME DISPLAY SCREEN AS THE AT LEAST PART OF THE ELECTRONIC VERSION OF THE DOCUMENT OPERATION 211.

In one embodiment, at DISPLAY THE DEFINITION OF THE USER SELECTED WORD IN THE SAME DISPLAY SCREEN AS THE AT LEAST PART OF THE ELECTRONIC VERSION OF THE DOCUMENT OPERATION 211 the definition of the user selected word of OBTAIN DATA REPRESENTING A DEFINITION FOR THE USER SELECTED WORD OPERATION 209 is displayed in an electronic media format on the same display screen of DISPLAY AT LEAST PART OF THE ELECTRONIC VERSION OF THE DOCUMENT ON A DISPLAY SCREEN OPERATION 205 displaying the at least a portion of the electronic media based version of a document of OBTAIN DATA REPRESENTING AN ELECTRONIC VERSION OF A DOCUMENT OPERATION 203.

In one embodiment, at DISPLAY THE DEFINITION OF THE USER SELECTED WORD IN THE SAME DISPLAY SCREEN AS THE AT LEAST PART OF THE ELECTRONIC VERSION OF THE DOCUMENT OPERATION 211 the definition of the user selected word of OBTAIN DATA REPRESENTING A DEFINITION FOR THE USER SELECTED WORD OPERATION 209 is displayed in an electronic media format on the same display screen of DISPLAY AT LEAST PART OF THE ELECTRONIC VERSION OF THE DOCUMENT ON A DISPLAY SCREEN OPERATION 205 displaying the at least a portion of the electronic media based version of a document of OBTAIN DATA REPRESENTING AN ELECTRONIC VERSION OF A DOCUMENT OPERATION 203 as a text display, graphical display, or icon.

In one embodiment, at DISPLAY THE DEFINITION OF THE USER SELECTED WORD IN THE SAME DISPLAY SCREEN AS THE AT LEAST PART OF THE ELECTRONIC VERSION OF THE DOCUMENT OPERATION 211 the definition of the user selected word of OBTAIN DATA REPRESENTING A DEFINITION FOR THE USER SELECTED WORD OPERATION 209 is displayed in an electronic media format on the same display screen of DISPLAY AT LEAST PART OF THE ELECTRONIC VERSION OF THE DOCUMENT ON A DISPLAY SCREEN OPERATION 205 displaying the at least a portion of the electronic media based version of a document of OBTAIN DATA REPRESENTING AN ELECTRONIC VERSION OF A DOCUMENT OPERATION 203 as, but is not limited to, any of the following: a screen pop-up/pop-up window display, graphical device, and/or icon; a Microsoft Windows Vista sidebar gadget display, graphical device, and/or icon, and/or any other sidebar display; a pop-up link display, graphical device, and/or icon; a screen header, footer, sidebar, or frame display, graphical device, and/or icon; any electronic attachment and/or computing system display, graphical device, and/or icon; a video and/or audio display, graphical device, and/or icon; and/or any other electronic media based display, graphical device, and/or icon, known in the art at the time of filing, or as developed/made available after the time of filing.

In one embodiment, once the definition of the user selected word of OBTAIN DATA REPRESENTING A DEFINITION FOR THE USER SELECTED WORD OPERATION 209 is displayed in an electronic media format on the same display screen of DISPLAY AT LEAST PART OF THE ELECTRONIC VERSION OF THE DOCUMENT ON A DISPLAY SCREEN OPERATION 205 displaying the at least a portion of the electronic media based version of a document of OBTAIN DATA REPRESENTING AN ELECTRONIC VERSION OF A DOCUMENT OPERATION 203 at DISPLAY THE DEFINITION OF THE USER SELECTED WORD IN THE SAME DISPLAY SCREEN AS THE AT LEAST PART OF THE ELECTRONIC VERSION OF THE DOCUMENT OPERATION 211, process flow proceeds to EXIT OPERATION 221.

In one embodiment, at EXIT OPERATION 221 process for providing a personalized dictionary and vocabulary building tool 200 is exited to await new data and/or the user selection of a new word.

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the invention as claimed below.

Using process for providing a personalized dictionary and vocabulary building tool 200, when a user/reader of an electronic media based document does not understand a given word presented in an electronic media based document, the user/reader selects the word and the user/reader is then provided an electronic media based display of the definition for the selected word within the display screen on which he or she is currently viewing the electronic media based document. Consequently, using process for providing a personalized dictionary and vocabulary building tool 200, the user/reader is provided the definition of the selected word without leaving the electronic media based document display, and without leaving the context of the electronic media based document. As a result, using process for providing a personalized dictionary and vocabulary building tool 200, the user/reader's time is more efficiently used, the user/reader, and the word, are remain within the context of the document, and there is less opportunity to introduce error and incorrect meanings of a word for the context of the word's use.

In one embodiment, in addition to being displayed in an electronic media format on the display screen associated with a computing system displaying the at least a portion of the electronic media format document, the user selected word, the definition of the user selected word, and any other data associated with the user selected word, such as the sentence employing the user selected word from the at least a portion of the electronic media based version of a document, is stored in a data storage device and associated with the user for further reference.

Figure 3:
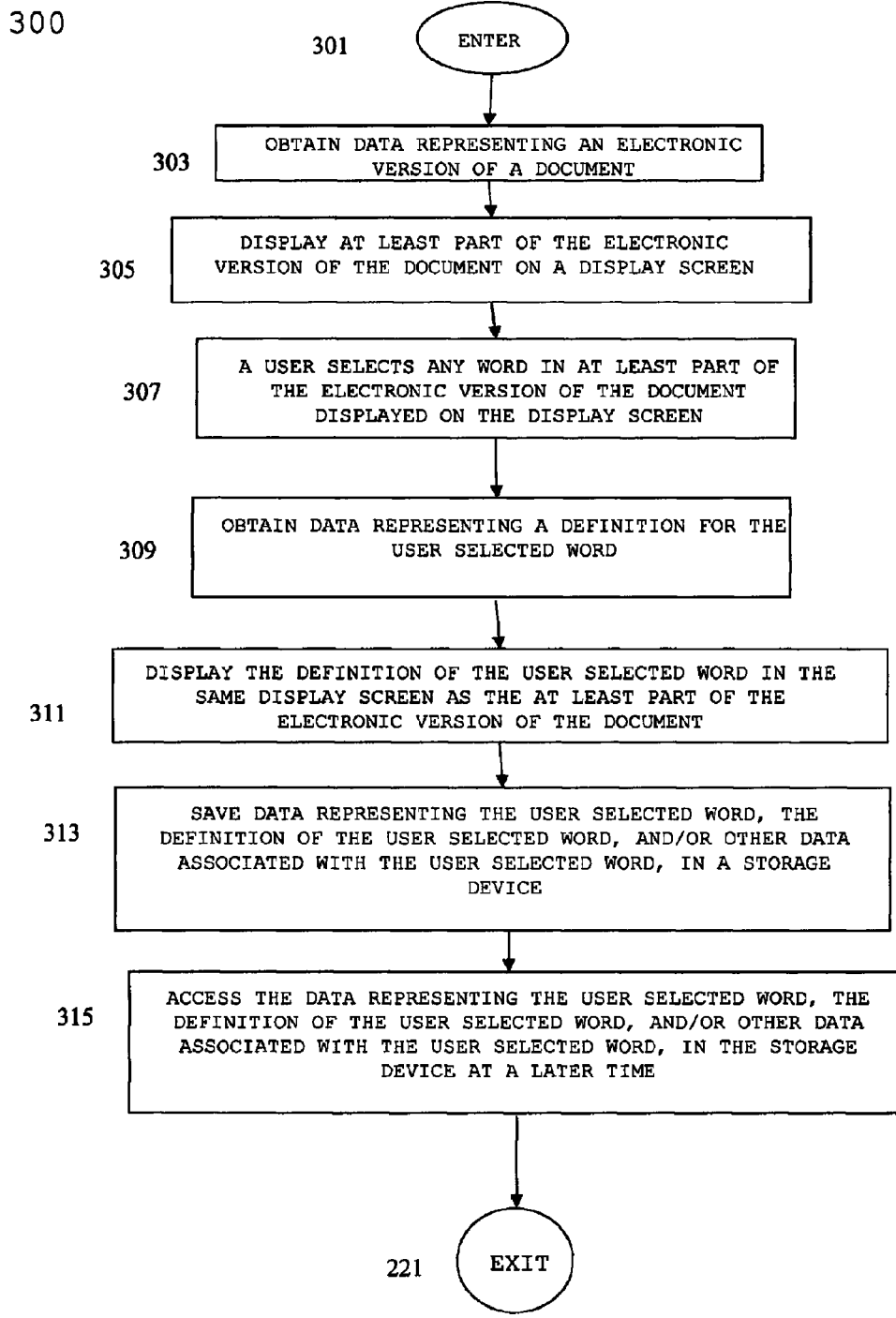
FIG. 3 is a flow chart depicting a process for providing a personalized dictionary and vocabulary building tool in accordance with one embodiment.

FIG. 3 is a flow chart depicting a process for providing a personalized dictionary and vocabulary building tool 300 in accordance with one embodiment. Process for providing a personalized dictionary and vocabulary building tool 300 begins at ENTER OPERATION 301 and process flow proceeds to OBTAIN DATA REPRESENTING AN ELECTRONIC VERSION OF A DOCUMENT OPERATION 303.

In one embodiment, the operations OBTAIN DATA REPRESENTING AN ELECTRONIC VERSION OF A DOCUMENT OPERATION 203; DISPLAY AT LEAST PART OF THE ELECTRONIC VERSION OF THE DOCUMENT ON A DISPLAY SCREEN OPERATION 205; A USER SELECTS ANY WORD IN AT LEAST PART OF THE ELECTRONIC VERSION OF THE DOCUMENT DISPLAYED ON THE DISPLAY SCREEN OPERATION 207; OBTAIN DATA REPRESENTING A DEFINITION FOR THE USER SELECTED WORD OPERATION 209; and DISPLAY THE DEFINITION OF THE USER SELECTED WORD IN THE SAME DISPLAY SCREEN AS THE AT LEAST PART OF THE ELECTRONIC VERSION OF THE DOCUMENT OPERATION 211 of process for providing a personalized dictionary and vocabulary building tool 200, of FIG. 2 are substantially identical to OBTAIN DATA REPRESENTING AN ELECTRONIC VERSION OF A DOCUMENT OPERATION 303; DISPLAY AT LEAST PART OF THE ELECTRONIC VERSION OF THE DOCUMENT ON A DISPLAY SCREEN OPERATION 305; A USER SELECTS ANY WORD IN AT LEAST PART OF THE ELECTRONIC VERSION OF THE DOCUMENT DISPLAYED ON THE DISPLAY SCREEN OPERATION 307; OBTAIN DATA REPRESENTING A DEFINITION FOR THE USER SELECTED WORD OPERATION 309; and DISPLAY THE DEFINITION OF THE USER SELECTED WORD IN THE SAME DISPLAY SCREEN AS THE AT LEAST PART OF THE ELECTRONIC VERSION OF THE DOCUMENT OPERATION 311 of process for providing a personalized dictionary and vocabulary building tool 300, of FIG. 3.

Consequently, the discussion above with respect to: OBTAIN DATA REPRESENTING AN ELECTRONIC VERSION OF A DOCUMENT OPERATION 203; DISPLAY AT LEAST PART OF THE ELECTRONIC VERSION OF THE DOCUMENT ON A DISPLAY SCREEN OPERATION 205; A USER SELECTS ANY WORD IN AT LEAST PART OF THE ELECTRONIC VERSION OF THE DOCUMENT DISPLAYED ON THE DISPLAY SCREEN OPERATION 207; OBTAIN DATA REPRESENTING A DEFINITION FOR THE USER SELECTED WORD OPERATION 209; and DISPLAY THE DEFINITION OF THE USER SELECTED WORD IN THE SAME DISPLAY SCREEN AS THE AT LEAST PART OF THE ELECTRONIC VERSION OF THE DOCUMENT OPERATION 211 of process for providing a personalized dictionary and vocabulary building tool 200, of FIG. 2 is applicable to, and incorporated here for, OBTAIN DATA REPRESENTING AN ELECTRONIC VERSION OF A DOCUMENT OPERATION 303; DISPLAY AT LEAST PART OF THE ELECTRONIC VERSION OF THE DOCUMENT ON A DISPLAY SCREEN OPERATION 305; A USER SELECTS ANY WORD IN AT LEAST PART OF THE ELECTRONIC VERSION OF THE DOCUMENT DISPLAYED ON THE DISPLAY SCREEN OPERATION 307; OBTAIN DATA REPRESENTING A DEFINITION FOR THE USER SELECTED WORD OPERATION 309; and DISPLAY THE DEFINITION OF THE USER SELECTED WORD IN THE SAME DISPLAY SCREEN AS THE AT LEAST PART OF THE ELECTRONIC VERSION OF THE DOCUMENT OPERATION 311 of process for providing a personalized dictionary and vocabulary building tool 300, of FIG. 3.

In one embodiment, once the definition of the user selected word of OBTAIN DATA REPRESENTING A DEFINITION FOR THE USER SELECTED WORD OPERATION 309 is displayed in an electronic media format on the same display screen of DISPLAY AT LEAST PART OF THE ELECTRONIC VERSION OF THE DOCUMENT ON A DISPLAY SCREEN OPERATION 305 displaying the at least a portion of the electronic media based version of a document of OBTAIN DATA REPRESENTING AN ELECTRONIC VERSION OF A DOCUMENT OPERATION 303 at DISPLAY THE DEFINITION OF THE USER SELECTED WORD IN THE SAME DISPLAY SCREEN AS THE AT LEAST PART OF THE ELECTRONIC VERSION OF THE DOCUMENT OPERATION 311, process flow proceeds to SAVE DATA REPRESENTING THE USER SELECTED WORD, THE DEFINITION OF THE USER SELECTED WORD, AND/OR OTHER DATA ASSOCIATED WITH THE USER SELECTED WORD, IN A STORAGE DEVICE OPERATION 313.

In one embodiment, at SAVE DATA REPRESENTING THE USER SELECTED WORD, THE DEFINITION OF THE USER SELECTED WORD, AND/OR OTHER DATA ASSOCIATED WITH THE USER SELECTED WORD, IN A STORAGE DEVICE OPERATION 313 the electronic data representing the definition of the user selected word of OBTAIN DATA REPRESENTING A DEFINITION FOR THE USER SELECTED WORD OPERATION 309, and any other data associated with the user selected word of A USER SELECTS ANY WORD IN AT LEAST PART OF THE ELECTRONIC VERSION OF THE DOCUMENT DISPLAYED ON THE DISPLAY SCREEN OPERATION 307, such as the sentence employing the user selected word from the at least a portion of the electronic media based version of a document of OBTAIN DATA REPRESENTING AN ELECTRONIC VERSION OF A DOCUMENT OPERATION 303, is stored in a data storage device and associated with the user for further reference.

In one embodiment, at SAVE DATA REPRESENTING THE USER SELECTED WORD, THE DEFINITION OF THE USER SELECTED WORD, AND/OR OTHER DATA ASSOCIATED WITH THE USER SELECTED WORD, IN A STORAGE DEVICE OPERATION 313 the electronic data representing the definition of the user selected word of OBTAIN DATA REPRESENTING A DEFINITION FOR THE USER SELECTED WORD OPERATION 309, and any other data associated with the user selected word of A USER SELECTS ANY WORD IN AT LEAST PART OF THE ELECTRONIC VERSION OF THE DOCUMENT DISPLAYED ON THE DISPLAY SCREEN OPERATION 307, such as the sentence employing the user selected word from the at least a portion of the electronic media based version of a document of OBTAIN DATA REPRESENTING AN ELECTRONIC VERSION OF A DOCUMENT OPERATION 303, is saved by storing the data, in whole, or in part, by any one of the numerous mechanisms known to those of skill in the art. For instance, in one embodiment, the data, in whole, or in part, is stored in a memory system, such as memory systems 103, 153 or server memory system 123, or database 170, of FIG. 1, or in a cache memory, such as cache memory 103A or 153A of FIG. 1, or in any main memory or mass memory, associated with a computing device, such as computing systems 100, 150, described above. In one embodiment, the data, in whole, or in part, is stored in any computing device and/or server system, such as computing systems 100, 150, or server system 120, or other device, in another location, or on/in computer readable medium, and/or any other computer program product, as defined herein. In one embodiment, the data, in whole, or in part, is stored on a webpage or in a web-based system.

Returning to FIG. 2, in some embodiments, the means for storing the electronic data representing the definition of the user selected word of OBTAIN DATA REPRESENTING A DEFINITION FOR THE USER SELECTED WORD OPERATION 309, and any other data associated with the user selected word of A USER SELECTS ANY WORD IN AT LEAST PART OF THE ELECTRONIC VERSION OF THE DOCUMENT DISPLAYED ON THE DISPLAY SCREEN OPERATION 307, such as the sentence employing the user selected word from the at least a portion of the electronic media based version of a document of OBTAIN DATA REPRESENTING AN ELECTRONIC VERSION OF A DOCUMENT OPERATION 303 are maintained, in whole, or in part, by: the provider of a parent computing system implemented data management system employing process for providing a personalized dictionary and vocabulary building tool 200; the provider of process for providing a personalized dictionary and vocabulary building tool 200; a third party service; or any other parties.

In one embodiment, once the electronic data representing the definition of the user selected word of OBTAIN DATA REPRESENTING A DEFINITION FOR THE USER SELECTED WORD OPERATION 309, and any other data associated with the user selected word of A USER SELECTS ANY WORD IN AT LEAST PART OF THE ELECTRONIC VERSION OF THE DOCUMENT DISPLAYED ON THE DISPLAY SCREEN OPERATION 307, such as the sentence employing the user selected word from the at least a portion of the electronic media based version of a document of OBTAIN DATA REPRESENTING AN ELECTRONIC VERSION OF A DOCUMENT OPERATION 303, is stored in a data storage device and associated with the user for further reference at SAVE DATA REPRESENTING THE USER SELECTED WORD, THE DEFINITION OF THE USER SELECTED WORD, AND/OR OTHER DATA ASSOCIATED WITH THE USER SELECTED WORD, IN A STORAGE DEVICE OPERATION 313, process flow proceeds to ACCESS THE DATA REPRESENTING THE USER SELECTED WORD, THE DEFINITION OF THE USER SELECTED WORD, AND/OR OTHER DATA ASSOCIATED WITH THE USER SELECTED WORD, IN THE STORAGE DEVICE AT A LATER TIME OPERATION 315.

In one embodiment, at ACCESS THE DATA REPRESENTING THE USER SELECTED WORD, THE DEFINITION OF THE USER SELECTED WORD, AND/OR OTHER DATA ASSOCIATED WITH THE USER SELECTED WORD, IN THE STORAGE DEVICE AT A LATER TIME OPERATION 315 the electronic data representing the definition of the user selected word of OBTAIN DATA REPRESENTING A DEFINITION FOR THE USER SELECTED WORD OPERATION 309, and any other data associated with the user selected word of A USER SELECTS ANY WORD IN AT LEAST PART OF THE ELECTRONIC VERSION OF THE DOCUMENT DISPLAYED ON THE DISPLAY SCREEN OPERATION 307, such as the sentence employing the user selected word from the at least a portion of the electronic media based version of a document of OBTAIN DATA REPRESENTING AN ELECTRONIC VERSION OF A DOCUMENT OPERATION 303, stored in a data storage device and associated with the user for further reference at SAVE DATA REPRESENTING THE USER SELECTED WORD, THE DEFINITION OF THE USER SELECTED WORD, AND/OR OTHER DATA ASSOCIATED WITH THE USER SELECTED WORD, IN A STORAGE DEVICE OPERATION 313 is accessed for use by the user of process for providing a personalized dictionary and vocabulary building tool 330, and/or process for providing a personalized dictionary and vocabulary building tool 300, and/or a third party.

In one embodiment, at ACCESS THE DATA REPRESENTING THE USER SELECTED WORD, THE DEFINITION OF THE USER SELECTED WORD, AND/OR OTHER DATA ASSOCIATED WITH THE USER SELECTED WORD, IN THE STORAGE DEVICE AT A LATER TIME OPERATION 315 the user selected word, the definition of the user selected word, and any other data associated with the user selected word, such as the sentence employing the user selected word from the at least a portion of the electronic media based version of a document of SAVE DATA REPRESENTING THE USER SELECTED WORD, THE DEFINITION OF THE USER SELECTED WORD, AND/OR OTHER DATA ASSOCIATED WITH THE USER SELECTED WORD, IN A STORAGE DEVICE OPERATION 313 is accessed by the user of process for providing a personalized dictionary and vocabulary building tool 330, and/or process for providing a personalized dictionary and vocabulary building tool 300, and/or a third party, for use as a vocabulary building and reference tool.

In this embodiment, process for providing a personalized dictionary and vocabulary building tool 300 is particularly useful for helping the user create a personalized dictionary and as a tool to, among other things: increase his or her vocabulary; prepare for standardized tests; quickly become familiar with the vocabulary associated with a new job, skill, or trade; study a new subject; lean a new language; or any other application where a portable and personalized dictionary and vocabulary building tool is beneficial.

In one embodiment, at ACCESS THE DATA REPRESENTING THE USER SELECTED WORD, THE DEFINITION OF THE USER SELECTED WORD, AND/OR OTHER DATA ASSOCIATED WITH THE USER SELECTED WORD, IN THE STORAGE DEVICE AT A LATER TIME OPERATION 315 the user selected word, the definition of the user selected word, and any other data associated with the user selected word, such as the sentence employing the user selected word from the at least a portion of the electronic media based version of a document of SAVE DATA REPRESENTING THE USER SELECTED WORD, THE DEFINITION OF THE USER SELECTED WORD, AND/OR OTHER DATA ASSOCIATED WITH THE USER SELECTED WORD, IN A STORAGE DEVICE OPERATION 313 is accessed by the user of process for providing a personalized dictionary and vocabulary building tool 330, and/or process for providing a personalized dictionary and vocabulary building tool 300, and/or a third party for use as a vocabulary drilling/testing tool. In this embodiment, the user selected word, the definition of the user selected word, and/or any other data associated with the user selected word is used by process for providing a personalized dictionary and vocabulary building tool 300 to generate a vocabulary drilling/testing mechanism whereby, in one example, the user is shown one of the previously user selected words and then the user is provided time to either recite the meaning, or select the meaning from a multiple choice list of possible meanings provided by process for providing a personalized dictionary and vocabulary building tool 300.

In one embodiment, at ACCESS THE DATA REPRESENTING THE USER SELECTED WORD, THE DEFINITION OF THE USER SELECTED WORD, AND/OR OTHER DATA ASSOCIATED WITH THE USER SELECTED WORD, IN THE STORAGE DEVICE AT A LATER TIME OPERATION 315 the user selected word, the definition of the user selected word, and any other data associated with the user selected word, such as the sentence employing the user selected word from the at least a portion of the electronic media based version of a document of SAVE DATA REPRESENTING THE USER SELECTED WORD, THE DEFINITION OF THE USER SELECTED WORD, AND/OR OTHER DATA ASSOCIATED WITH THE USER SELECTED WORD, IN A STORAGE DEVICE OPERATION 313 is accessed by the user of process for providing a personalized dictionary and vocabulary building tool 330, and/or process for providing a personalized dictionary and vocabulary building tool 300, and/or a third party for use in determining/establishing a base-line vocabulary for the group of users.

For instance, in one embodiment, the multiple users are students in a given class. In this instance, the members of the class can be provided a given electronic media based document to read and to request/obtain definitions for words in the document as they read using process for providing a personalized dictionary and vocabulary building tool 300. Then, the user selected words, and/or the definitions of the user selected words, and/or any other data associated with the user selected words for each of the class members is aggregated and analyzed to evaluate the vocabulary skills of the class as a group. In other embodiments, this same analysis could be used for an employee base or a market research group, or any other group, in a similar manner to determine/establish a base-line vocabulary for the group of users.

In one embodiment, once the electronic data representing the definition of the user selected word of OBTAIN DATA REPRESENTING A DEFINITION FOR THE USER SELECTED WORD OPERATION 309, and any other data associated with the user selected word of A USER SELECTS ANY WORD IN AT LEAST PART OF THE ELECTRONIC VERSION OF THE DOCUMENT DISPLAYED ON THE DISPLAY SCREEN OPERATION 307, such as the sentence employing the user selected word from the at least a portion of the electronic media based version of a document of OBTAIN DATA REPRESENTING AN ELECTRONIC VERSION OF A DOCUMENT OPERATION 303, stored in a data storage device and associated with the user for further reference at SAVE DATA REPRESENTING THE USER SELECTED WORD, THE DEFINITION OF THE USER SELECTED WORD, AND/OR OTHER DATA ASSOCIATED WITH THE USER SELECTED WORD, IN A STORAGE DEVICE OPERATION 313 is accessed for use by the user of process for providing a personalized dictionary and vocabulary building tool 330, and/or process for providing a personalized dictionary and vocabulary building tool 300, and/or a third party at ACCESS THE DATA REPRESENTING THE USER SELECTED WORD, THE DEFINITION OF THE USER SELECTED WORD, AND/OR OTHER DATA ASSOCIATED WITH THE USER SELECTED WORD, IN THE STORAGE DEVICE AT A LATER TIME OPERATION 315, process flow proceeds to EXIT OPERATION 321.

In one embodiment, at EXIT OPERATION 321 process for providing a personalized dictionary and vocabulary building tool 300 is exited to await new data and/or the user selection of a new word.

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the invention as claimed below.

Using process for providing a personalized dictionary and vocabulary building tool 300, the user selected word, the definition of the user selected word, and any other data associated with the user selected word, such as the sentence employing the user selected word from the at least a portion of the electronic media based version of a document, is stored in a data storage device and associated with the user for further reference. Consequently, using process for providing a personalized dictionary and vocabulary building tool 300, the user selected word, the definition of the user selected word, and any other data associated with the user selected word, can be later recalled by the user to: refresh his or her memory of the meaning of the word; to create a personalized dictionary for the user; to help the user build/review his or her vocabulary; to create a testing/vocabulary building exercise; and/or to establish a base-line analysis of the user's vocabulary skills.

In addition, in one embodiment, using process for providing a personalized dictionary and vocabulary building tool 300, the user selected words, the definition of the user selected words, and any other data associated with the user selected words, for multiple users are stored in a data storage device and associated with the users and/or the group of users for further reference. Consequently, using process for providing a personalized dictionary and vocabulary building tool 300, the user selected words, the definition of the user selected words, and any other data associated with the user selected words, can be aggregated and/or analyzed: to create a personalized dictionary for the group of users; to help the group of users group build/review their vocabulary; to create a testing/vocabulary building exercise for the group of users; and/or to establish a base-line analysis of the vocabulary skills of the group of users.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, and/or protocols. Further, the system and/or functionality of the invention may be implemented via various combinations of software and hardware, as described, or entirely in hardware elements. Also, particular divisions of functionality between the various components described herein is merely exemplary, and not mandatory or significant. Consequently, functions performed by a single component may, in other embodiments, be performed by multiple components, and functions performed by multiple components may, in other embodiments, be performed by a single component.

Some portions of the above description present the features of the present invention in terms of algorithms and symbolic representations of operations, or algorithm-like representations, of operations on information/data. These algorithmic and/or algorithm-like descriptions and representations are the means used by those of skill in the art to most effectively and efficiently convey the substance of their work to others of skill in the art. These operations, while described functionally or logically, are understood to be implemented by computer programs and/or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as "obtaining" "storing", "saving", "displaying", "categorizing", "providing", "aggregating", "modifying", "accessing", "selecting" etc., refer to the action and processes of a computing system or similar electronic device that manipulates and operates on data represented as physical (electronic) quantities within the computing system memories, resisters, caches or other information storage, transmission or display devices.

Certain aspects of the present invention include process steps or operations and instructions described herein in an algorithmic and/or algorithmic-like form. It should be noted that the process steps and/or operations and instructions of the present invention can be embodied in software, firmware, and/or hardware, and when embodied in software, can be downloaded to reside on and be operated from different platforms used by real time network operating systems.

The present invention also relates to an apparatus or system for performing the operations described herein. This apparatus or system may be specifically constructed for the required purposes, or the apparatus or system can comprise a general purpose system selectively activated or configured/reconfigured by a computer program stored on a computer program product as defined herein that can be accessed by a computing system or other device.

Those of skill in the art will readily recognize that the algorithms and operations presented herein are not inherently related to any particular computing system, computer architecture, computer or industry standard, or any other specific apparatus. Various general purpose systems may also be used with programs in accordance with the teaching herein, or it may prove more convenient/efficient to construct more specialized apparatuses to perform the required operations described herein. The required structure for a variety of these systems will be apparent to those of skill in the art, along with equivalent variations. In addition, the present invention is not described with reference to any particular programming language and it is appreciated that a variety of programming languages may be used to implement the teachings of the present invention as described herein, and any references to a specific language or languages are provided for illustrative purposes only and for enablement of the contemplated best mode of the invention at the time of filing.

The present invention is well suited to a wide variety of computer network systems operating over numerous topologies. Within this field, the configuration and management of large networks comprise storage devices and computers that are communicatively coupled to similar and/or dissimilar computers and storage devices over a private network, a LAN, a WAN, a private network, or a public network, such as the Internet.

It should also be noted that the language used in the specification has been principally selected for readability, clarity and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the FIGS. for method and apparatus and/or process or application for providing a personalized dictionary and vocabulary building tool, discussed herein, are identified using a particular nomenclature for ease of description and understanding, but other nomenclature is often used in the art to identify equivalent operations.

Therefore, numerous variations, whether explicitly provided for by the specification or implied by the specification or not, may be implemented by one of skill in the art in view of this disclosure.

What is claimed is:

1. A computing system implemented process for providing a personalized dictionary and vocabulary building tool comprising:
    obtaining data representing at least part of an electronic media based document and a vocabulary attachment to the electronic media based document;
    displaying the at least part of an electronic media based document to a user on a display screen;
    providing the user with the capability to select any word in the at least part of an electronic media based document displayed on the display screen to obtain a definition for the user selected word;
    the user selecting a word in the at least part of an electronic media based document displayed on the display screen to obtain a definition for the user selected word;
    in response to the user selecting the word in the at least part of an electronic media based document displayed on the display screen to obtain a definition for the user selected word, obtaining data representing a definition for the user selected word;
    displaying the definition for the user selected word in an electronic media based format on the display screen displaying the at least part of an electronic media based document, the data representing a definition for the user selected word having been obtained from the vocabulary attachment included with the electronic media based document;
    aggregating the user selected words and the definitions of the user selected words for a defined group of users;
    analyzing the aggregated user selected words and definitions to create a personalized dictionary for the group of users; and
    creating a vocabulary building exercise for the group of users, including establishing a base-line analysis of the vocabulary skills of the group of users.

2. The computing system implemented process for providing a personalized dictionary and vocabulary building tool of claim 1, wherein:
    at least part of the electronic media based document is chosen from the group of electronic media based documents consisting of:
    an electronic media based version of a trade and/or professional book, or any portion thereof;
    an electronic media based version of a work of fiction, or any portion thereof;
    an electronic media based version of a work of non-fiction, or any portion thereof;
    an electronic media based version of a school textbook, or any portion thereof;
    an electronic media based version of a business document, or any portion thereof;
    an electronic media based version of a presentation, or any portion thereof;
    an electronic media based version of a news article, or any portion thereof;
    an electronic media based version of a shared work and/or private document, or any portion thereof;
    an electronic media based version of a legal document, or any portion thereof; and
    any document containing at least one word of electronic media based text.

3. The computing system implemented process for providing a personalized dictionary and vocabulary building tool of claim 1, wherein:
    at least part of the data representing at least part of an electronic media based document is obtained from the group of sources of an electronic media based document consisting of:
    a computing system implemented data management system;
    a database;
    a computing system;
    a server system;
    a web-site or other web-based system;
    a computer program product;
    the Internet;
    a network of computing systems and/or server systems;
    e-mail;
    text messaging; and
    screen scraping.

4. The computing system implemented process for providing a personalized dictionary and vocabulary building tool of claim 1, wherein:
    at least part of the data representing at least part of an electronic media based document is obtained from a seller of electronic media based documents.

5. The computing system implemented process for providing a personalized dictionary and vocabulary building tool of claim 1, wherein:
    displaying the at least part of an electronic media based document to a user on a display screen comprises displaying the at least part of an electronic media based document on a display screen associated with a computing system.

6. The computing system implemented process for providing a personalized dictionary and vocabulary building tool of claim 1, wherein:
    providing the user with the capability to select any word in the at least part of an electronic media based document displayed on the display screen to obtain a definition for the user selected word comprises displaying the at least part of an electronic media based document to a user on a display screen associated with a computing system that includes a user interface device.

7. The computing system implemented process for providing a personalized dictionary and vocabulary building tool of claim 1, wherein:
    providing the user with the capability to select any word in the at least part of an electronic media based document displayed on the display screen to obtain a definition for the user selected word comprises displaying the at least part of an electronic media based document to a user on a display screen that is a touch-screen.

8. The computing system implemented process for providing a personalized dictionary and vocabulary building tool of claim 1, wherein:
    the data representing a definition for the user selected word is obtained from an electronic media based dictionary.

9. The computing system implemented process for providing a personalized dictionary and vocabulary building tool of claim 1, wherein:
    the data representing a definition for the user selected word is obtained from a computing system associated with the user.

10. The computing system implemented process for providing a personalized dictionary and vocabulary building tool of claim 1, wherein:

the data representing a definition for the user selected word is obtained from a computing system associated with the source of the electronic media based document.

11. The computing system implemented process for providing a personalized dictionary and vocabulary building tool of claim 1, wherein:
the data representing a definition for the user selected word is obtained from a network of computing systems.

12. The computing system implemented process for providing a personalized dictionary and vocabulary building tool of claim 1, wherein:
the data representing a definition for the user selected word is obtained from the Internet.

13. The computing system implemented process for providing a personalized dictionary and vocabulary building tool of claim 1, wherein:
the definition for the user selected word is displayed in an electronic media based format on the display screen displaying the at least part of an electronic media based document as a sub-display.

14. The computing system implemented process for providing a personalized dictionary and vocabulary building tool of claim 1, wherein:
the definition for the user selected word is displayed in an electronic media based format on the display screen displaying the at least part of an electronic media based document as a pop-up display.

15. The computing system implemented process for providing a personalized dictionary and vocabulary building tool of claim 1, further comprising:
saving data representing the user selected word and the definition for the user selected word in a data storage device and associating the data representing the user selected word and the definition for the user selected word with the user.

16. The computing system implemented process for providing a personalized dictionary and vocabulary building tool of claim 15, further comprising:
saving data representing text associated with the selected word from the electronic media based document and associating the data representing text associated with the selected word from the electronic media based document to record the context of the use of the selected word within the electronic media based document.

17. The computing system implemented process for providing a personalized dictionary and vocabulary building tool of claim 15, further comprising:
using the data representing the user selected word and the definition for the user selected word to create a personalized vocabulary database for the user that can be accessed to review the user selected word and the definition for the user selected word.

18. The computing system implemented process for providing a personalized dictionary and vocabulary building tool of claim 15, further comprising:
using the data representing the user selected word and the definition for the user selected word to create a personalized vocabulary training/testing tool for the user that can be accessed by the user to test the user's ability to recall the definition for the user selected word.

19. The computing system implemented process for providing a personalized dictionary and vocabulary building tool of claim 1, further comprising:
saving data representing the user selected words and the definition for the user selected words from a group of multiple users of the computing system implemented process for providing a personalized dictionary and vocabulary building tool in a data storage device and associating the data representing the user selected words and the definition for the user selected words with the group of multiple users.

20. The computing system implemented process for providing a personalized dictionary and vocabulary building tool of claim 19, further comprising:
analyzing the data representing the user selected words and the definition for the user selected words from a group of multiple users of the computing system implemented process for providing a personalized dictionary and vocabulary building tool to establish a base-line vocabulary level for the group of multiple users.

21. A system for providing a personalized dictionary and vocabulary building tool comprising:
a computing system; and
a processor for executing a process for providing a personalized dictionary and vocabulary building tool, the process for providing a personalized dictionary and vocabulary building tool comprising:
obtaining data representing at least part of an electronic media based document and a vocabulary attachment to the electronic media based document;
displaying the at least part of an electronic media based document to a user on a display screen associated with the computing system;
providing the user with the capability to select any word in the at least part of an electronic media based document displayed on the display screen to obtain a definition for the user selected word;
the user selecting a word in the at least part of an electronic media based document displayed on the display screen to obtain a definition for the user selected word;
in response to the user selecting the word in the at least part of an electronic media based document displayed on the display screen to obtain a definition for the user selected word, obtaining data representing a definition for the user selected word;
displaying the definition for the user selected word in an electronic media based format on the display screen displaying the at least part of an electronic media based document, the data representing a definition for the user selected word having been obtained from the vocabulary attachment included with the electronic media based document;
aggregating the user selected words and the definitions of the user selected words for a defined group of users;
analyzing the aggregated user selected words and definitions to create a personalized dictionary for the group of users; and
creating a vocabulary building exercise for the group of users, including establishing a base-line analysis of the vocabulary skills of the group of users.

22. The system for providing a personalized dictionary and vocabulary building tool of claim 21, wherein:
providing the user with the capability to select any word in the at least part of an electronic media based document displayed on the display screen to obtain a definition for the user selected word comprises displaying the at least part of an electronic media based document to a user on a display screen that is a touch-screen.

23. The system for providing a personalized dictionary and vocabulary building tool of claim 21, wherein:
the data representing a definition for the user selected word is obtained from an electronic media based dictionary.

24. The system for providing a personalized dictionary and vocabulary building tool of claim 21, wherein:

the data representing a definition for the user selected word is obtained from a computing system associated with the user.

25. The system for providing a personalized dictionary and vocabulary building tool of claim 21, wherein:
the data representing a definition for the user selected word is obtained from a computing system associated with the source of the electronic media based document.

26. The system for providing a personalized dictionary and vocabulary building tool of claim 21, wherein:
the data representing a definition for the user selected word is obtained from a network of computing systems.

27. The system for providing a personalized dictionary and vocabulary building tool of claim 21, wherein:
the definition for the user selected word is displayed in an electronic media based format on the display screen displaying the at least part of an electronic media based document as a sub-display.

28. The system for providing a personalized dictionary and vocabulary building tool of claim 21, wherein:
the definition for the user selected word is displayed in an electronic media based format on the display screen displaying the at least part of an electronic media based document as a pop-up display.

29. The system for providing a personalized dictionary and vocabulary building tool of claim 21, wherein, the process for providing a personalized dictionary and vocabulary building tool further comprises:
saving data representing the user selected word and the definition for the user selected word in a data storage device and associating the data representing the user selected word and the definition for the user selected word with the user.

30. The system for providing a personalized dictionary and vocabulary building tool of claim 29, wherein, the process for providing a personalized dictionary and vocabulary building tool further comprises:
using the data representing the user selected word and the definition for the user selected word to create a personalized vocabulary database for the user that can be accessed to review the user selected word and the definition for the user selected word.

31. The system for providing a personalized dictionary and vocabulary building tool of claim 29, wherein, the process for providing a personalized dictionary and vocabulary building tool further comprises:
using the data representing the user selected word and the definition for the user selected word to create a personalized vocabulary training/testing tool for the user that can be accessed by the user to test the user's ability to recall the definition for the user selected word.

32. The system for providing a personalized dictionary and vocabulary building tool of claim 21, wherein, the process for providing a personalized dictionary and vocabulary building tool further comprises:
saving data representing text associated with the selected word from the electronic media based document and associating the data representing text associated with the selected word from the electronic media based document to record the context of the use of the selected word within the electronic media based document.

33. The system for providing a personalized dictionary and vocabulary building tool of claim 21, wherein, the process for providing a personalized dictionary and vocabulary building tool further comprises:
saving data representing the user selected words and the definition for the user selected words from a group multiple users of the computing system implemented process for providing a personalized dictionary and vocabulary building tool in a data storage device and associating the data representing the user selected words and the definition for the user selected words with the group of multiple users.

34. The system for providing a personalized dictionary and vocabulary building tool of claim 33, wherein, the process for providing a personalized dictionary and vocabulary building tool further comprises:
analyzing the data representing the user selected words and the definition for the user selected words from a group of multiple users of the computing system implemented process for providing a personalized dictionary and vocabulary building tool to establish a base-line vocabulary level for the group of multiple users.

35. A computer program product for providing a personalized dictionary and vocabulary building tool comprising:
a computer readable medium;
and computer program code, encoded on the computer readable medium, comprising computer readable instructions executed on a processor for:
obtaining data representing at least part of an electronic media based document and a vocabulary attachment to the electronic media based document;
displaying the at least part of an electronic media based document to a user on a display screen;
providing the user with the capability to select any word in the at least part of an electronic media based document displayed on the display screen to obtain a definition for the user selected word;
the user selecting a word in the at least part of an electronic media based document displayed on the display screen to obtain a definition for the user selected word;
in response to the user selecting the word in the at least part of an electronic media based document displayed on the display screen to obtain a definition for the user selected word, obtaining data representing a definition for the user selected word;
displaying the definition for the user selected word in an electronic media based format on the display screen displaying the at least part of an electronic media based document, the data representing a definition for the user selected word having been obtained from the vocabulary attachment included with the electronic media based document;
aggregating the user selected words and the definitions of the user selected words for a defined group of users;
analyzing the aggregated user selected words and definitions to create a personalized dictionary for the group of users; and
creating a vocabulary building exercise for the group of users, including establishing a base-line analysis of the vocabulary skills of the group of users.

36. The computer program product for providing a personalized dictionary and vocabulary building tool of claim 35, wherein, the computer program code, encoded on the computer readable medium, further comprises computer readable instructions executed on a processor for:
saving data representing the user selected word and the definition for the user selected word in a data storage device and associating the data representing the user selected word and the definition for the user selected word with the user.

37. The computer program product for providing a personalized dictionary and vocabulary building tool of claim 36, wherein, the computer program code, encoded on the computer readable medium, further comprises computer readable instructions executed on a processor for:

using the data representing the user selected word and the definition for the user selected word to create a personalized vocabulary database for the user that can be accessed to review the user selected word and the definition for the user selected word.

38. The computer program product for providing a personalized dictionary and vocabulary building tool of claim 36, wherein, the computer program code, encoded on the computer readable medium, further comprises computer readable instructions executed on a processor for:

using the data representing the user selected word and the definition for the user selected word to create a personalized vocabulary training/testing tool for the user that can be accessed by the user to test the user's ability to recall the definition for the user selected word.

39. The computer program product for providing a personalized dictionary and vocabulary building tool of claim 35, wherein, the computer program code, encoded on the computer readable medium, further comprises computer readable instructions executed on a processor for:

saving data representing text associated with the selected word from the electronic media based document and associating the data representing text associated with the selected word from the electronic media based document to record the context of the use of the selected word within the electronic media based document.

40. The computer program product for providing a personalized dictionary and vocabulary building tool of claim 35, wherein, the computer program code, encoded on the computer readable medium, further comprises computer readable instructions executed on a processor for:

saving data representing the user selected words and the definition for the user selected words from a group multiple users of the computing system implemented process for providing a personalized dictionary and vocabulary building tool in a data storage device and associating the data representing the user selected words and the definition for the user selected words with the group of multiple users.

41. The computer program product for providing a personalized dictionary and vocabulary building tool of claim 40, wherein, the computer program code, encoded on the computer readable medium, further comprises computer readable instructions executed on a processor for:

analyzing the data representing the user selected words and the definition for the user selected words from a group of multiple users of the computing system implemented process for providing a personalized dictionary and vocabulary building tool to establish a base-line vocabulary level for the group of multiple users.

\* \* \* \* \*